United States Patent
Baba et al.

(10) Patent No.: US 8,763,911 B2
(45) Date of Patent: Jul. 1, 2014

(54) RFID TAG

(75) Inventors: Shunji Baba, Kawasaki (JP); Naoki Ishikawa, Kawasaki (JP); Shigeru Hashimoto, Inagi (JP); Tsuyoshi Niwata, Inagi (JP); Yoshiyasu Sugimura, Inagi (JP); Satoru Nogami, Shirakwa (JP); Mimpei Miura, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 63 days.

(21) Appl. No.: 13/423,422

(22) Filed: Mar. 19, 2012

(65) Prior Publication Data

US 2012/0248198 A1 Oct. 4, 2012

(30) Foreign Application Priority Data

Mar. 30, 2011 (JP) ................................. 2011-076193

(51) Int. Cl.
*G06K 19/02* (2006.01)

(52) U.S. Cl.
USPC .......................................... 235/488; 235/492

(58) Field of Classification Search
USPC ........................................ 235/488, 487, 492
See application file for complete search history.

(56) References Cited

U.S. PATENT DOCUMENTS

| | | | |
|---|---|---|---|
| 7,605,708 B2 * | 10/2009 | Cote et al. .................. 340/572.8 |
| 7,698,873 B2 * | 4/2010 | Coronado .................... 52/796.1 |
| 7,988,057 B2 * | 8/2011 | Nomura ........................ 235/492 |
| 8,114,722 B2 * | 2/2012 | Kakehata ...................... 438/151 |
| 2006/0290514 A1 | 12/2006 | Sakama et al. |
| 2010/0123011 A1 | 5/2010 | Baba et al. |
| 2010/0243743 A1 | 9/2010 | Takeuchi et al. |
| 2011/0272470 A1 | 11/2011 | Baba et al. |

FOREIGN PATENT DOCUMENTS

| | | |
|---|---|---|
| EP | 2 172 878 A2 | 4/2010 |
| JP | 2008-159007 A | 7/2008 |
| JP | 2009-135605 A | 6/2009 |
| KR | 10-2006-0134782 A | 12/2006 |
| KR | 10-2010-0055328 A | 5/2010 |

OTHER PUBLICATIONS

Korean Office Action application No. 10-2012-32068 dated Mar. 8, 2013.
Extended European Search Report dated Mar. 4, 2014, issued in corresponding EP patent application No. 12159855.1.

* cited by examiner

*Primary Examiner* — Daniel St Cyr
(74) *Attorney, Agent, or Firm* — Squire Sanders (US) LLP

(57) ABSTRACT

An RFID tag is disclosed that includes a first sheet having flexibility and elasticity; an antenna having flexibility and elasticity and configured to be formed on a surface of the first sheet; an IC chip configured to be electrically connected to the antenna; a second sheet having flexibility and elasticity and configured to be attached to the first sheet and to cover the antenna and the IC chip with the first sheet; and a reinforcing member having flexibility and elasticity and configured to cover the IC chip and a connecting portion of the IC chip and the antenna.

19 Claims, 21 Drawing Sheets

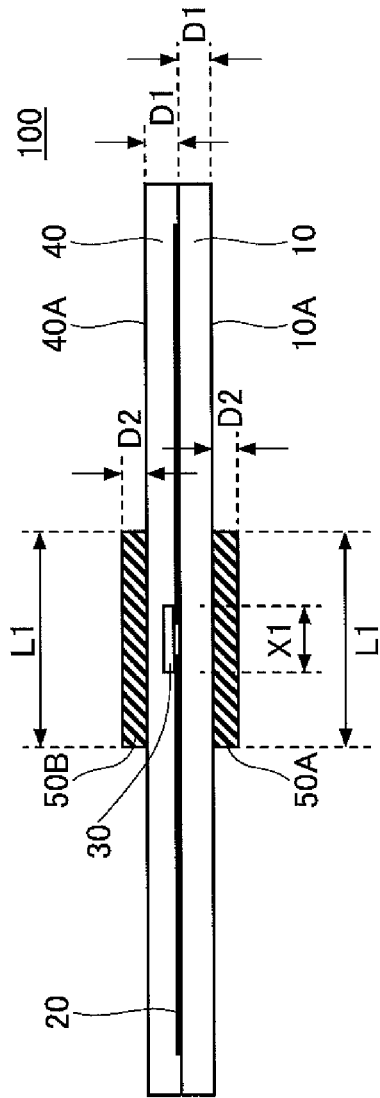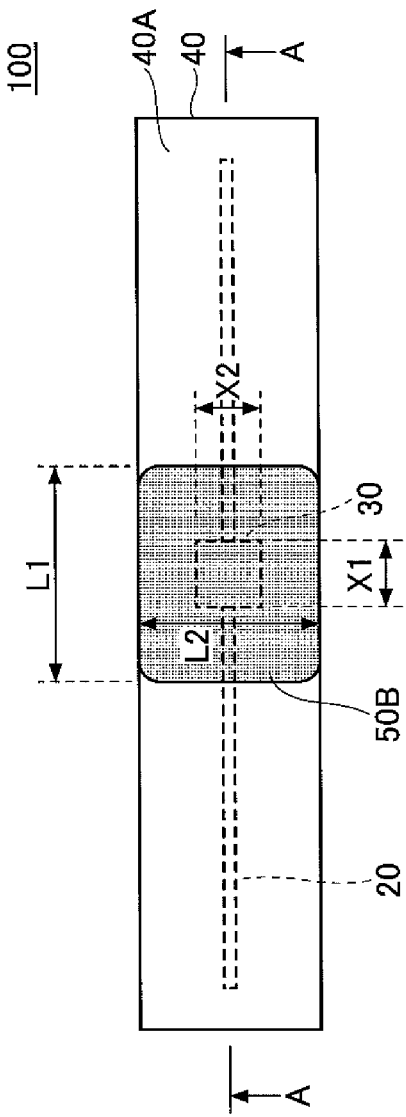
FIG.5A
FIG.5B

RFID TAG

CROSS-REFERENCE TO RELATED APPLICATIONS

This patent application is based upon and claims the benefit of priority of the prior Japanese Patent Application No. 2011-076193 filed on Mar. 30, 2011, the entire contents of which are incorporated herein by reference.

FIELD

The embodiments discussed herein are related to an RFID tag.

BACKGROUND

FIG. 1A is a diagram illustrating a conventional RFID tag 1 in plan view. FIG. 1B is a diagram illustrating an A-A cross section of the RFID tag as illustrated in FIG. 1A.

A Radio Frequency Identifier (RFID) tag 1 is a type of an RFID tag which can be fitted on goods such as clothes that are flexible and are worn by people.

As illustrated in FIGS. 1A and 1B, the RFID tag 1 includes an inlay 2 and a cover 3 which covers the inlay 2 and is made of gum elastic.

The inlay includes a base 4, an antenna 5, an IC chip 6, a chip reinforcing body 7 and backside reinforcing body 8.

The base 4 is made of a PET film. The antenna 5 is a type of an antenna for communication and is formed onto the base 4. The IC chip 6 is electrically connected to the antenna 5 and performs wireless communication via the antenna 5.

The chip reinforcing body 7 is made of a fiber reinforced resin and surrounds the IC chip 6. The chip reinforcing body 7 and the IC chip 6 are adhered onto the top surface of the base 4 by a thermosetting adhesion bond 9.

The backside reinforcing body 8 is made of a fiber reinforced resin in a similar fashion to the chip reinforcing body 7 and is adhered onto the bottom surface of the inlay 2 by the thermosetting adhesion bond 9.

Conventionally, there has been a film antenna including a conductive circuit which is made of metal and is formed onto at least one surface of a film that is made of modified polyolefin grafted with unsaturated carboxylic acid. The modified polyolefin grafted with unsaturated carboxylic acid provides electrical insulation properties.

The RFID tag can be fitted on goods such as sheets or towels professionally used at hotels and napkins or hand towels professionally used at restaurants for example, besides the goods that are worn by people.

In order to use the sheets or the like over and over again, for example, they are collected from the hotels and the restaurants by a laundry service provider and are returned to the owners after being washed at the laundry service provider.

Since the laundry service provider washes a large amount of laundry such as sheets or the like, the laundry service provider associates the laundry with names or addresses of the owners of the laundry every time the laundry is collected by the laundry service provider from the owners.

Since the laundry service provider handles an enormous amount of information such as the names of the owners, the laundry service provider manages the information easily and effectively by attaching the RFID tags to the laundry and by using identifiers of the RFID tags, for example.

However, for example, when the laundry service provider extracts water from the laundry after washing them with water, the laundry service provider may use an extracting machine in order to facilitate efficiency of extraction. The extracting machine includes a huge piston and a huge container, and extracts water from lots of the laundry in the container by pressing them with the piston. Hereinafter the way of the extraction as described above is referred to as a press extraction.

The diameters of the piston and the container may be a few meters, for example, in a case where the container has a cylindrical hollow shape. Since a pressure applied to the laundry by the piston may be ranging from 30 kgf/cm$^2$ to 50 kgf/cm$^2$, for example, the extraction is performed at a very severe condition for the RFID tags.

When the press extraction of the laundry fitted with the RFID tags that include the base made of the PET film or the reinforcing body made of the fiber reinforced resin is performed, the base or the reinforcing body may be broken by the pressure.

In a case where the base made of the PET film is broken, the antenna of the RFID tag may be broken. In a case where the reinforcing body made of the fiber reinforced resin is broken, the IC chip of the RFID tag may be broken. In any of these cases, there is a problem in that the RFID tag may be broken.

In a case where the press extraction is performed repeatedly, the problem as described above may occur with goods other than the sheets etc in a similar manner.

Herein, the conventional film antenna can be bent. Even if an RFID tag is manufactured by mounting the IC chip onto the film antenna, the RFID tag is not capable of withstanding the press extraction in a case where the RFID tag does not include an IC chip protecting member.

Even if the IC chip protecting member is attached to the RFID tag, the RFID tag is not capable of withstanding repeated press extraction in a case where the IC chip protecting member is made of hard material. In this case, the IC chip protecting member may be broken by repeated press extraction.

As described above, the conventional RFID tag has weak durability.

PRIOR ART REFERENCES

Patent References

[Patent Reference 1] Japanese Patent Laid-Open Publication No. 2008-159007
[Patent Reference 2] Japanese Patent Laid-Open Publication No. 2009-135605

SUMMARY

According to an aspect of an embodiment, there is provided an RFID tag including: a first sheet having flexibility and elasticity; an antenna having flexibility and elasticity and configured to be formed on a surface of the first sheet; an IC chip configured to be electrically connected to the antenna; a second sheet having flexibility and elasticity and configured to be attached to the first sheet and to cover the antenna and the IC chip with the first sheet; and a reinforcing member having flexibility and elasticity and configured to cover the IC chip and a connecting portion of the IC chip and the antenna.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

BRIEF DESCRIPTION OF THE DRAWINGS

FIG. 5A is a diagram illustrating the RFID tag according to the first embodiment;

FIG. 5B is a diagram illustrating the RFID tag according to the first embodiment;

DESCRIPTION OF EMBODIMENTS

A description is given, with reference to the accompanying drawings, of embodiments of an RFID tag.

First Embodiment

Figure 1A:
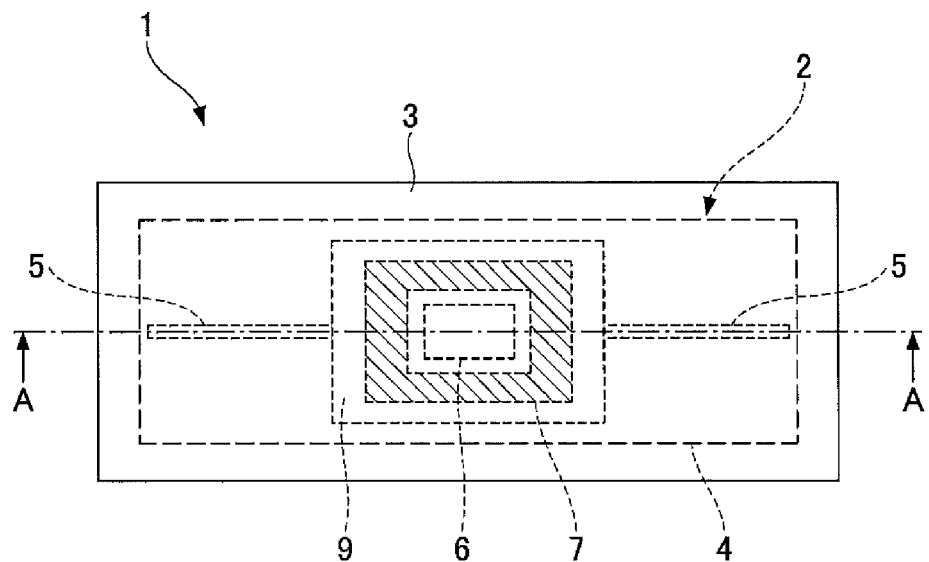
FIG. 1A is a diagram illustrating a conventional RFID tag 1 in plan view.
Figure 1B:
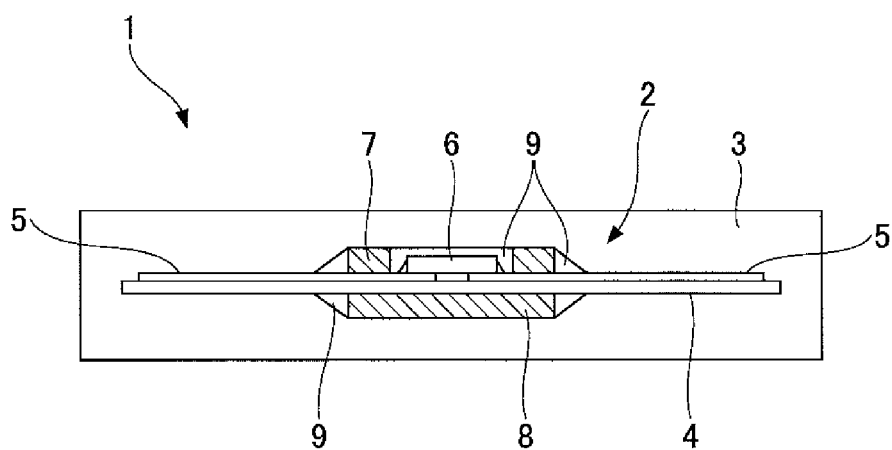
FIG. 1B is a diagram illustrating an A-A cross section of the RFID tag as illustrated in FIG. 1A.
Figure 2C:
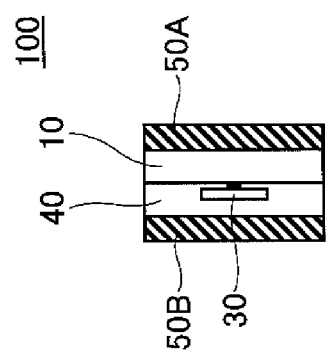
FIG. 2C is a diagram illustrating the RFID tag along the direction orthogonal to the longitudinal direction.
Figure 2A:
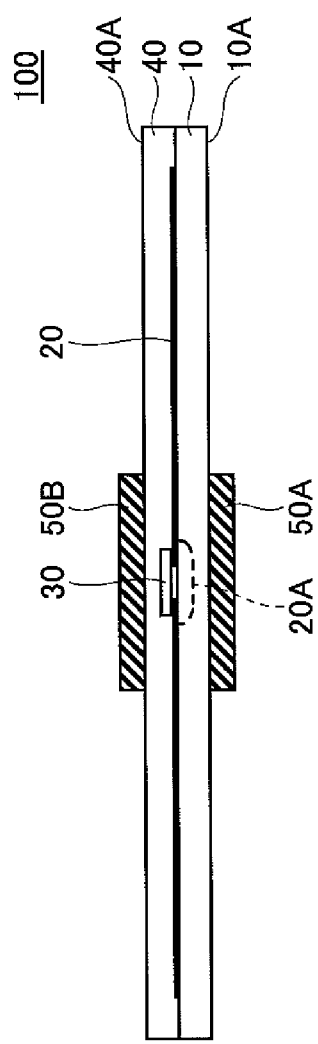
FIG. 2A is a diagram illustrating a cross section of the RFID tag along the longitudinal direction.
Figure 2B:
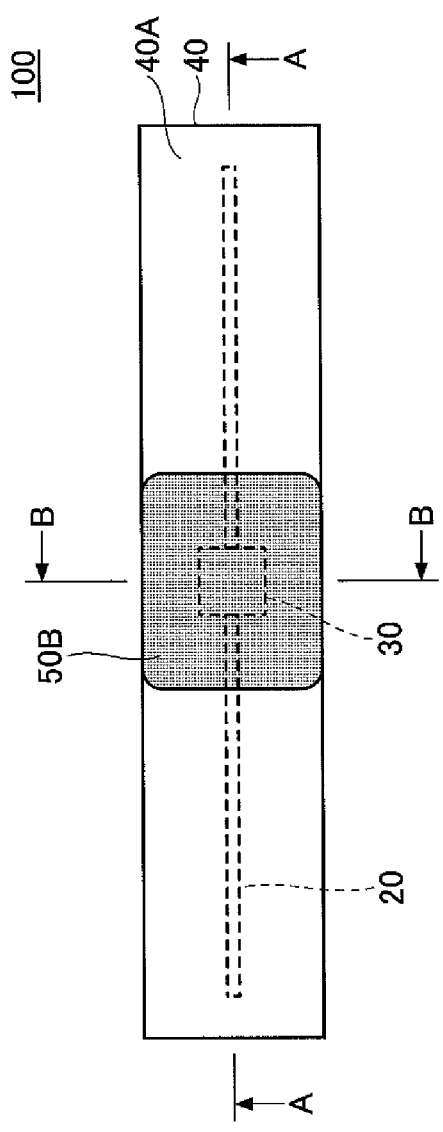
FIG. 2B is a diagram illustrating the RFID tag in plan view.

FIG. 2A is a diagram illustrating a cross section of the RFID tag 100 along the longitudinal direction. FIG. 2B is a diagram illustrating the RFID tag 100 in plan view. FIG. 2C is a diagram illustrating the RFID tag 100 along the direction orthogonal to the longitudinal direction. FIG. 2A illustrates an A-A cross section of the RFID tag 100 as illustrated in FIG. 2B. FIG. 2C illustrates a B-B cross section of the RFID tag 100 as illustrated in FIG. 2B.

As illustrated in FIGS. 2A to 2C, the RFID tag 100 includes a base 10, an antenna 20, an IC chip 30, a cover 40 and reinforcing members 50A and 50B.

The base 10 is a type of a sheet-like member which is formed in a sheet shape and has flexibility and elasticity. The base 10 is one example of a first sheet. The antenna 20 is formed on one surface of the base 10 and the IC chip 30 is mounted on the same surface as that of the antenna 20 before the base 10 and the cover 40 are bonded with each other.

The base 10 is formed by calendaring performed by a calender machine or extrusion etc.

A member which has entropic elasticity may be used as the member which constitutes the base 10 having flexibility and elasticity, for example. The entropic elasticity includes rubber elasticity and elastomer elasticity, for example. Thus, for example, rubber material which has rubber elasticity or elastomer material which has elastomer elasticity may be used as material of the base 10 having flexibility and elasticity.

A silicone (silica-ketone) rubber, butyl rubber, a nitrile rubber, a nitrile hydride rubber, a fluoride rubber, an epichlorohydrin rubber, an isoprene rubber, a chlorosulfonated polyethylene rubber or a urethane rubber may be used as the rubber material, for example.

An elastomer of vinyl chloride series, styrene series, olefin series, ester series, urethane series or amide series may be used as the elastomer material, for example.

Herein, the material of the base 10 is not limited to a member which is made of the materials described above and is not limited to the member which has entropic elasticity, as long as the material of the base 10 has flexibility and elasticity.

The antenna 20 is formed on one surface before the base 10 and the cover 40 are bonded with each other. The antenna 20 has flexibility and elasticity and includes conductive particles.

The antenna 20 may be made of silver paste which has flexibility and elasticity, for example.

A pattern of the antenna 20 in plan view and a connecting portion 20A of the antenna 20 will be hereinafter described in detail with reference to FIG. 3. The material of the antenna 20, i.e. the silver paste, and a method for forming the antenna 20 will be hereinafter described in detail with reference to FIG. 4.

The IC chip 30 is formed on one surface before the base 10 and the cover 40 are bonded with each other.

When the IC chip 30 receives a read signal included within a Radio Frequency (RF) band from a reader/writer of the RFID tag 100 via the antenna 20, the IC chip 30 receives power from the read signal. Then the IC chip operates and sends identifier information via the antenna 20 by using the power. Thus, the reader/writer can read the identifier information of the RFID tag 100.

The cover 40 is a type of a member which is formed in a sheet shape and has flexibility and elasticity. The cover 40 is one example of a second sheet. The size of the cover 40 is equal to that of the base 10 in plan view. The thickness of the cover 40 is equal to that of the base 10. The cover 40 may be made of the same member formed in the sheet shape as that of the base 10, for example.

The cover 40 is bonded with the base 10 and covers the antenna 20 and the IC chip 30 between the base 10.

The cover 40 is formed by calendaring performed by the calender machine or extrusion etc.

A member which is similar to that of the base 10 may be used as the member of the cover 40 having flexibility and elasticity, for example.

Herein, the member which constitutes the cover 40 may be different from that of the base 10.

The reinforcing member 50A is adhered to a portion of a surface 10A (a bottom surface as illustrated in FIG. 2A) of the base 10. The portion to which the reinforcing member 50A is adhered is located under the IC chip 30 and the connecting portion 20A which connects the IC chip 30 and the antenna 20. The reinforcing member 50A covers the IC chip 30 and the connecting portion 20A through the base 10.

The reinforcing member 50B is adhered to a portion of a surface 40A (a top surface as illustrated in FIG. 2A) of the cover 40. The portion to which the reinforcing member 50B is adhered is located over the IC chip 30 and the connecting portion 20A. The reinforcing member 50B covers the IC chip 30 and the connecting portion 20A through the cover 40.

The reinforcing members 50A and 50B are formed by calendaring performed by the calender machine or extrusion etc.

The reinforcing members 50A and 50B are made of members that have flexibility and elasticity, respectively. The reinforcing members 50A and 50B have the same size as each other.

A member which is similar to that of the base 10 may be used as the member of the reinforcing members 50A having flexibility and elasticity. Although the member which constitutes the reinforcing member 50A may be different from that of the base 10, it is preferable to use the same member for the reinforcing member 50A as that of the base 10.

A member which is similar to that of the cover 40 may be used as the member of the reinforcing members 50B having flexibility and elasticity. Although the member which constitutes the reinforcing member 50B may be different from that of the cover 40, it is preferable to use the same member for the reinforcing member 50B as that of the cover 40.

Hardness of the members of the reinforcing members 50A and 50B having flexibility and elasticity may be higher than the members of the base 10 and the cover 40, respectively.

This is for the sake of reinforcing portions of the base 10 and the cover 40 that are close to the IC chip 30 and the connecting portion 20A by adhering the reinforcing members 50A and 50B to the outer side of the base 10 and the cover 40, respectively, in a case where the reinforcing members 50A and 50B are less likely to be bent than the base 10 and the cover 40.

Hardness of the members of the reinforcing members 50A and 50B having flexibility and elasticity may be lower than the members of the base 10 and the cover 40, respectively.

This is for the sake of suppressing peel off or breakage of the IC chip 30 by suppressing transmission of deformation of the reinforcing members 50A and 50B to the IC chip 30 in a case where the reinforcing members 50A and 50B that are more likely to be bent than the base 10 and the cover 40.

Among the components included in the RFID tag 100, the IC chip 30 and the connecting portion 20A are unable to be bent and may be broken if they are subjected to stress. Thus, in order to protect the IC chip 30 and the connecting portion 20A, the portion close to the IC chip 30 and the connecting portion 20A is made resistant to being bent.

Herein, hardness of the members of the reinforcing members 50A and 50B, the base 10 and the cover 40 may be set as the rubber hardness.

For example, in a case where the rubber hardness of the base 10 and the cover 40 are set to JIS A 70, the rubber hardness of the reinforcing members 50A and 50B may be set to JIS A 80.

For example, in a case where the rubber hardness of the base 10 and the cover 40 are set to JIS A 80, the rubber hardness of the reinforcing members 50A and 50B may be set to JIS A 90. Herein, JIS A 80 and JIS A 90 represent hardness of a rubber under Japanese Industrial Standardization (JIS) Law.

The rubber hardness of the reinforcing members 50A and 50B are set to higher value than that of the base 10 and the cover 40 according to the first embodiment, for example. Herein, it is preferable to set the hardness of the reinforcing members 50A and 50B to the same value.

Next, the antenna 20 formed on the surface of the base 10 and the IC chip 30 mounted on the surface of the base 10 are described with reference to FIG. 3.

Figure 3A:
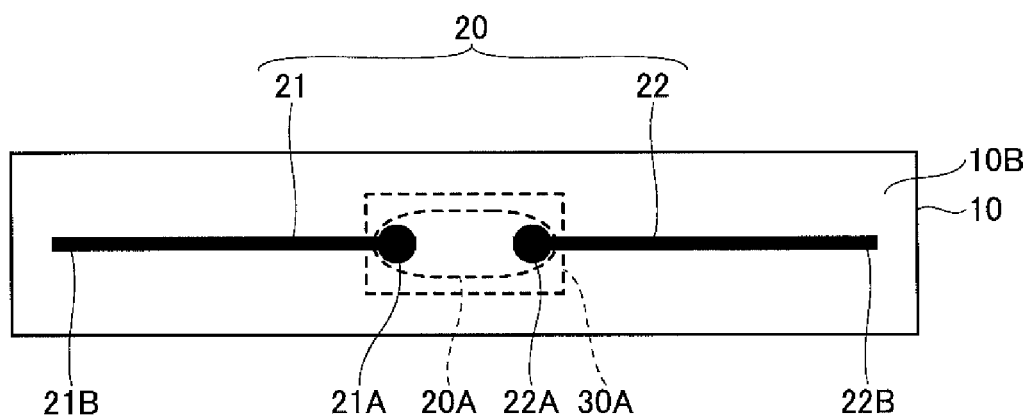
FIG. 3A is a diagram illustrating the antenna of the RFID tag in plan view.
Figure 3B:
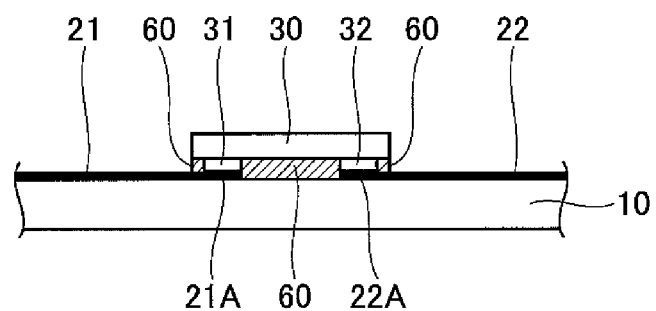
FIG. 3B is a diagram illustrating a cross section around the connecting portion and the IC chip.

FIG. 3A is a diagram illustrating the antenna 20 of the RFID tag 100 in plan view. FIG. 3B is a diagram illustrating a cross section around the connecting portion 20A and the IC chip 30. In FIGS. 3A, 3B, the IC chip 30 and the connecting portion 20A are enlarged compared with FIGS. 2A to 2C.

As illustrated in FIG. 3A, the antenna 20 is formed by printing the silver paste having flexibility and elasticity on a surface 10B of the base 10. The surface 10B is the opposite surface of the surface 10A. The antenna 20 is a type of a dipole antenna and includes antenna portions 21 and 22.

Lengths of the antenna portions 21 and 22 may be set corresponding to a communication frequency of the RFID tag 100. Since frequency bands of 952 MHz to 954 MHz or 2.45 GHz are assigned for the communication of the RFID tags in Japan, for example, length of the antenna portions 21 and 22 between edges 21B and 22B may be set to a half length of wavelength at the communication frequency of the RFID tag 100. Since frequency bands of 915 MHz and 868 MHz are assigned for the RFID tags in the United States and Europe (EU) respectively, for example, the length of the antenna portions 21 and 22 may be set to a half length of wavelength at the communication frequency of the RFID tag 100.

Herein, an area 30A in which the IC chip 30 is to be mounted is represented by a dotted line. A pair of terminals of the IC chip 30 that is connected to the antenna 20 is connected to a terminal 21A of the antenna portion 21 and a terminal 22A of the antenna portion 22.

Herein, the surface 10B of the base 10 is located on opposite side of the surface 10A. The cover 40 is adhered to the surface 10B.

As illustrated in FIG. 3B, the IC chip 30 is mounted on the surface 10B by flip-chip bonding, and the terminals of the IC chip 30 that are used for communication are connected to the antenna 20. The terminals of the IC chip 30 that are used for communication are connected to the terminals 21A and 22A of the antenna 20 via bumps 31 and 32. The bumps 31 and 32 are attached to the terminals of the IC chip 30 that are used for communication in advance, for example.

The IC chip 30 is fixed on the surface 10B of the base 10 by an underfill resin 60. This causes the terminals 21A and 22A of the antenna 20 to be electrically connected to the bumps 31 and 32, and the antenna 20 to be electrically connected to the IC chip 30.

The connecting portion 20A which connects the IC chip 30 and the antenna 20 as illustrated in FIG. 2A corresponds to the terminals 21A and 22A and the bumps 31 and 32 that are enlarged in FIG. 3B.

Next, the silver paste 23 that forms the antenna 20 is described with reference to FIG. 4.

Figure 4:
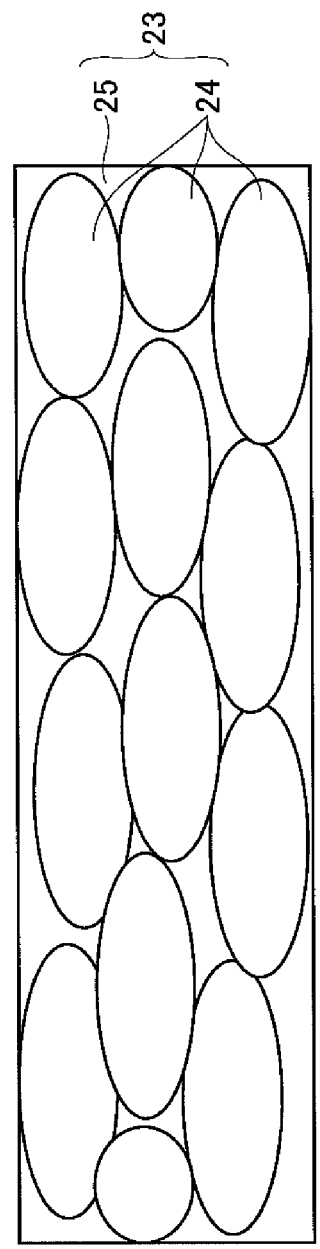
FIG. 4 is a diagram illustrating a configuration of the silver paste which forms the antenna of the RFID tag according to the first embodiment.

FIG. 4 is a diagram illustrating a configuration of the silver paste 23 which forms the antenna 20 of the RFID tag 100 according to the first embodiment.

The silver paste 23 which forms the antenna 20 of the RFID tag 100 is on example of a conductive paste which includes silver particles 24 and binder 25. The silver particles 24 are one example of conductive particles. In FIG. 4, circles represents the silver particles 24, and portions that exist around the silver particles 24 represented in circles represent the binder 25.

The binder 25 may be made of member which has flexibility and elasticity. A silicone (silica-ketone) rubber, butyl rubber, a nitrile rubber, a nitrile hydride rubber, a fluoride rubber, an epichlorohydrin rubber, an isoprene rubber, a chlorosulfonated polyethylene rubber or a urethane rubber may be used as the binder 25, for example. The silver particles 24 are mixed with the binder 25.

The antenna 20 has flexibility and elasticity by using the binder 25 having flexibility and elasticity. Thus, it becomes possible to suppress breakage of the antenna 20 in a case where the RFID tag 100 is bent during the press extraction.

The antenna 20 is formed by printing the silver paste 23 on the surface 10B of the base 10 as illustrated in FIG. 3 and by thermally hardening the binder 25 by heating.

Since the silver paste 23 after being hardened by thermal hardening process has flexibility and elasticity, it becomes possible to form the antenna 20 having flexibility and elasticity.

Although the silver paste 23 including the silver particles 24 as the conductive particles is described above, a copper paste including copper particles as the conductive particles or a nickel paste including nickel particles as the conductive particles may be used instead of the silver paste 23.

Next, exemplary dimensions of the RFID tag 100 are described with reference to the FIGS. 5 and 6.

FIGS. 5A to 6D are diagrams illustrating the RFID tag 100 according to the first embodiment. FIG. 5A is a diagram illustrating a cross section of the RFID tag 100 in a condition in that the RFID tag 100 is not bent. FIG. 5B is a diagram illustrating the RFID tag 100 in plan view in a condition in that the RFID tag 100 is not bent. The cross section as illustrated in FIG. 5A corresponds to the cross section as illustrated in FIG. 2A. FIG. 5A illustrates a A-A cross section of the RFID tag 100 as illustrated in FIG. 5B.

Figure 6A:
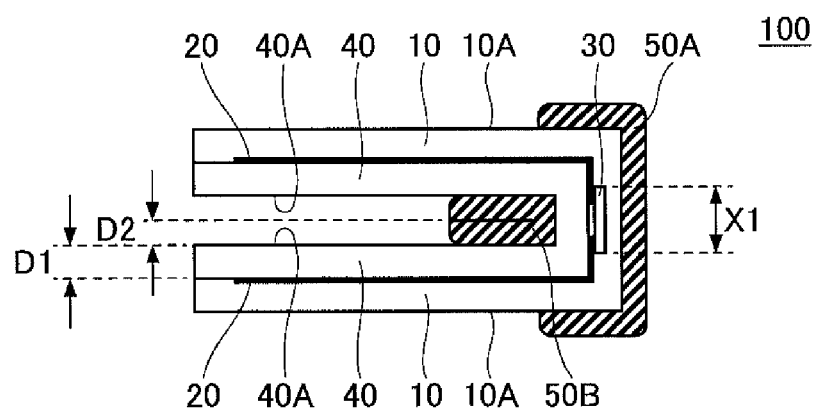
FIG. 6A is a diagram illustrating the RFID tag according to the first embodiment.
Figure 6B:
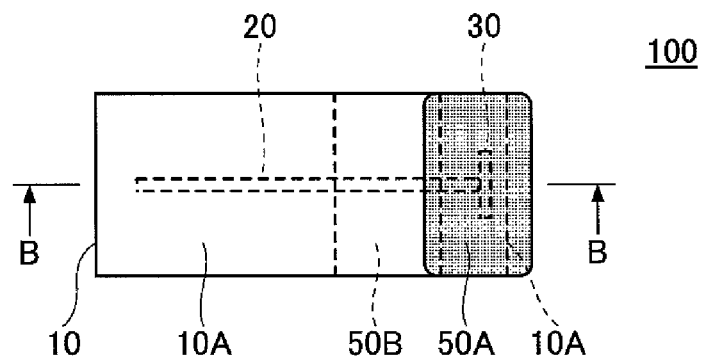
FIG. 6B is a diagram illustrating the RFID tag according to the first embodiment.

FIG. 6A is a diagram illustrating a cross section of the RFID tag 100 in a condition in that the RFID tag 100 is bent in a U-shape. FIG. 6B is a diagram illustrating the RFID tag 100 in plan view in a condition in that the RFID tag 100 is bent in a U-shape. FIG. 6A illustrates a B-B cross section of the RFID tag 100 as illustrated in FIG. 6B.

Figure 6C:
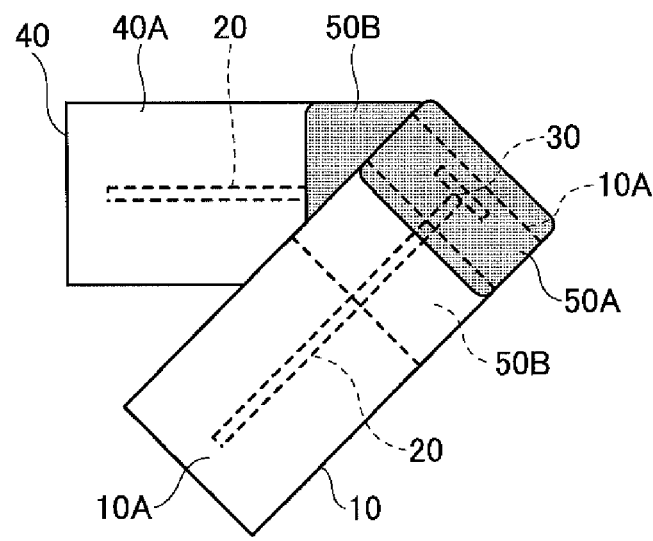
FIG. 6C is a diagram illustrating the RFID tag according to the first embodiment.
Figure 6D:
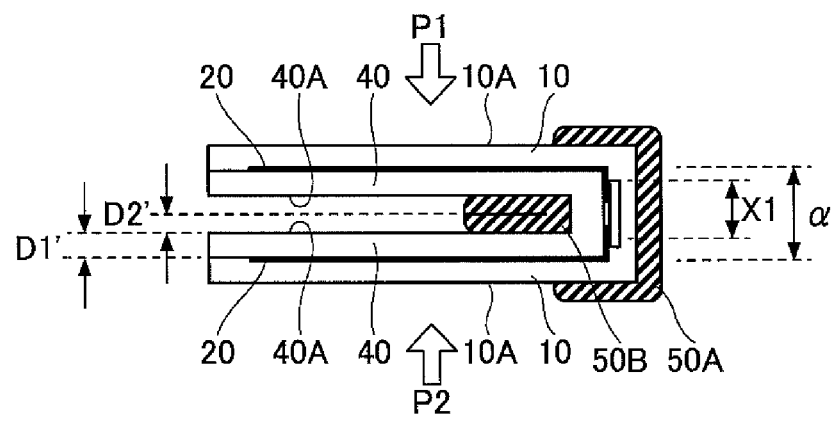
FIG. 6D is a diagram illustrating the RFID tag according to the first embodiment.

FIG. 6C is a diagram illustrating the RFID tag 100 in plan view in a condition in that the RFID tag 100 is twisted obliquely and bent in a U-shape. FIG. 6D is a diagram illustrating a cross section of the RFID tag 100 in a condition in that the RFID tag 100 is bent in a U-shape with pressure. FIG. 6D illustrates a cross section corresponding to the B-B cross section of the RFID tag 100 as illustrated in FIG. 6B.

Herein, as illustrated in FIGS. 5A and 5B, length of an edge of the IC chip 30 in lateral direction is referred to as X1. As illustrated in FIG. 5B, length of an edge of the IC chip 30 in a direction orthogonal to the lateral direction in plan view is referred to as X2. The IC chip 30 has a square shape in plan view. Thus, the length X1 is equal to the length X2. In a case where the length X1 and the length X2 are indiscriminate, lengths of the edges of the IC chip 30 are referred to X.

As illustrated in FIG. 5A, lengths of edges in the lateral direction of the reinforcing members 50A and 50B are referred to L1. The sizes of the reinforcing members 50A and 50B are equal to each other and lengths of edges of the reinforcing members 50A and 50B in a direction orthogonal to the lateral direction in plan view is referred to as L2. In a case where the length L1 and the length L2 are indiscriminate, lengths of the edges of the reinforcing members 50A and 50B are referred to L.

Sizes of the base 10 and the cover 40 are equal to each other. Thicknesses of the base 10 and the cover 40 are referred to as D1. Thicknesses of the reinforcing members 50A and 50B are referred to as D2.

If the RFID tag 100 as illustrated in FIGS. 5A and 5B is bent in a U-shape in a direction in that the reinforcing member 50B and the cover 40 are located on the inner side as illustrated in FIGS. 6A and 6B.

If the RFID tag 100 as illustrated in FIGS. 5A and 5B is twisted obliquely and bent in a U-shape in a direction in that the reinforcing member 50B and the cover 40 are located on the inner side as illustrated in FIG. 6C.

If the RFID tag 100 as illustrated in FIGS. 5A and 5B is bent and squashed in a U-shape in a direction in that the reinforcing member 50B and the cover 40 are located on the inner side as illustrated in FIG. 6D. In the RFID tag 100 as illustrated in FIG. 6D, the base 10, the cover 40 and the reinforcing members 50A and 50B are squashed in thickness direction by pressure represented by arrows P1 and P2 compared with the RFID tag 100 as illustrated in FIG. 6A.

Situations as illustrated in FIGS. 6A to 6C may occur in a case where the laundry to which the RFID tags 100 are attached are washed by a laundry machine. In a case where the RFID tag 100 is squashed by the press extraction, the base 10, the cover 40 and the reinforcing members 50A and 50B may be bent in a U-shape and squashed in thickness direction as illustrated in FIG. 6D.

The most harsh condition for the RFID tag 100 is twisted obliquely and bent in a U-shape as illustrated in FIG. 6C and is further squashed in thickness direction by the pressure as illustrated in FIG. 6D.

In the RFID tag 100 as illustrated in FIG. 6D, the thicknesses of the base 10 and the cover 40 become D1' which is thinner than the thickness D1 as illustrated in FIG. 5A, and the thicknesses of the reinforcing members 50A and 50B become D2' which is thinner than the thickness D2 as illustrated in FIG. 5A.

Since the base 10 and the cover 40 have flexibility and elasticity, the base 10 and the cover 40 are deformable as illustrated in FIG. 6D. Similarly, since the antenna 20 is made of silver paste 23 having flexibility and elasticity, the antenna 20 is deformable as illustrated in FIG. 6D.

However, the IC chip 30 and the connecting portion 20A are not deformable and may be broken if they are deformed. Thus, it is preferable to protect the IC chip 30 and the connecting portion 20A from deformation in a case where the RFID tag 100 is twisted obliquely and bent in a U-shape as illustrated in FIG. 6C and is further squashed in thickness direction as illustrated in FIG. 6D.

Thus, in the RFID tag 100, the length X of the IC chip 30, the lengths L and the thicknesses D2 of the reinforcing members 50A and 50B, and thicknesses D1 of the base 10 and the cover 40 satisfy formulas (1) to (3), in order to protect the IC chip 30 and the connecting portion 20A from the deformation.

$$L > X \tag{1}$$

$$\alpha > \sqrt{2} \times X \tag{2}$$

$$\alpha = 2 \times \{(D1 - \delta1) + (D2 - \delta2)\} \tag{3}$$

Herein, δ1 represents deformation amount of each of the base 10 and the cover 40 when the base 10 and the cover 40 are squashed by a designated pressure. The thicknesses of the base 10 and the cover 40 become thinner than the thicknesses D1 by the deformation amount δ1, respectively. Herein, δ2 represents a deformation amount of each of the reinforcing members 50A and 50B when the reinforcing members 50A and 50B are squashed by a designated pressure. The thicknesses of the reinforcing members 50A and 50B become thinner than the thicknesses D2 by the deformation amount δ2, respectively.

(D1−δ1) in the formula (3) represents the thickness D1' of each of the base 10 and the cover 40 when the RFID tag 100 is bent in a U-shape and is further squashed by the pressure indicated by the arrows P1 and P2 as illustrated in FIG. 6D, i.e. the thickness (D1−δ1) is equal to the thickness D1'. (D2−δ2) in the formula (3) represents the thickness D2' of each of the reinforcing members 50A and 50B when the RFID tag 100 is bent in a U-shape and is further squashed by the pressure indicated by the arrows P1 and P2 as illustrated in FIG. 6D, i.e. the thickness (D2−δ2) is equal to the thickness D2'.

Herein, the thicknesses of the base 10 and the cover 40 and the thicknesses of the reinforcing members 50A and 50B become D1' and D2', respectively, in a situation where the RFID tag 100 is bent in a U-shape and is further squashed by the pressure as illustrated in FIG. 6D. In this situation, the RFID tag 100 is bent in a U-shape, but is not twisted obliquely as illustrated in FIG. 6C. However, the thicknesses of the base 10 and the cover 40 and the thicknesses of the reinforcing members 50A and 50B in a in a situation where the RFID tag 100 is twisted obliquely and bent in a U-shape as illustrated in FIG. 6C and is further squashed by the pressure are almost the same as the thicknesses D1' and D2' as illustrated in FIG. 6D. Therefore, regardless of whether the RFID tag 100 is twisted obliquely or not, in a case where the RFID tag 100 is bent in a U-shape and is further squashed by the pressure, the thicknesses of the base 10 and the cover 40 and the thicknesses of the reinforcing member 50A and 50B are treated as D1' and D2', respectively.

Formula (1) indicates that sizes of the reinforcing members 50A and 50B in plan view are larger than the size of the IC chip 30 in plan view (see FIG. 5B).

Formula (2) indicates that the length a as illustrated in FIG. 6D is longer than the maximum length ($\sqrt{2} \times X$) of the IC chip 30 in a case where the RFID tag 100 is bent in a U-shape and is further squashed by the pressure indicated by arrows P1 and P2. Formula (2) is derived from a condition where the IC chip 30 and the connecting portion 20A are not deformed as long as the length a is longer than the maximum length of the IC chip 30. It becomes possible to suppress the breakage of IC chip 30 and the connecting portion 20A as long as the RFID tag 100 satisfies formula (2).

Herein, the maximum length ($\sqrt{2} \times X$) of the IC chip 30 is obtained between a pair of diagonally opposite corners of the IC chip 30 in plan view.

The length α is obtained from the thickness (D2−δ2) of the reinforcing member 50B which is located on the inner side of the base 10 and the cover 40 and the thickness (D1−δ1) of the cover 40, in a case where the RFID tag 100 is bent and squashed as illustrated in FIG. 6D. Thus, the length α represented by formula (3).

The length α is obtained by any of the reinforcing member 50A and the base 10 or the reinforcing member 50B and the cover 40 that are located on the inner side of the IC chip 30 in a case where the RFID tag 100 is bent in a direction in which any of the base 10 or the cover 40 becomes the inner side of the a U-shape.

As described above, according to the RFID tag 100 of the first embodiment, the sizes of the reinforcing members 50A and 50B are larger than the size of the IC chip 30 in plan view (see formula (1)) and the length α, as illustrated in FIG. 6D, is longer than the maximum length ($\sqrt{2} \times X$) of the IC chip 30 (see formula (2)).

Thus, it becomes possible to suppress the breakage of the IC chip 30 and the connecting portion 20A by protecting the IC chip 30 and the connecting portion 20A by the reinforcing members 50A and 50B, the base 10 and the cover 40 in a case where the RFID tag 100 is twisted obliquely and bent in a U-shape as illustrated in FIG. 6C and is further squashed by the pressure as illustrated in FIG. 6D.

Accordingly, it becomes possible to provide the RFID tag 100 which has very high durability and can suppress the breakage of the IC chip 30 and the connecting portion 20A, if the RFID tag 100 is subjected to a harsh condition such as the press extraction, for example.

Herein, the deformation amount δ1 may vary in accordance with the materials of the base 10 and the cover and the pressure applied thereto. Similarly, the deformation amount δ2 may vary in accordance with the materials of the reinforcing members 50A and 50B and the pressure applied thereto.

Accordingly, the thicknesses D1 of the base 10 and the cover 40 may be determined so that formula (2) is established in consideration of the deformation amount δ1 which depends on the materials of the base 10 and the cover 40 and the pressure applied to the laundry to which the RFID tag 100 is attached.

Similarly, the thicknesses D2 of the reinforcing members 50A and 50B may be determined so that formula (2) is established in consideration of the deformation amount δ2 which depends on the materials of the reinforcing members 50A and 50B and the pressure applied in the laundry to which the RFID tag 100 is attached.

Although, as described above, the IC chip 30 has a square shape in plan view, the IC chip 30 may have rectangle shape. If the IC chip 30 has a rectangle shape in plan view, the length of the long side of the rectangle shape may be determined as the length X which satisfies formulas (1) and (2).

Although, as described above, the lengths L1 and L2 of the reinforcing members 50A and 50B in plan view are equal to each other, the lengths L1 and L2 may be different to each other. If the lengths L1 and L2 are not equal, lengths L1 or L2 whichever is longer may be determined as the length L which satisfies formula (1). In a case where the reinforcing members 50A and 50B have the rectangle shapes in plan view, lengths of the long sides may be determined as the length L which satisfies formula (1).

Although, as described above, formula (2) includes the maximum length ($\sqrt{2} \times X$) of the IC chip 30, formula (2) may include shorter length instead of the maximum length ($\sqrt{2} \times X$) in a case where it is possible to suppress the breakage of the IC chip 30 and the connecting portion 20A. In this case, formula (2) may be varied to formula (2') by including length X instead of the length ($\sqrt{2} \times X$) included in formula (2) where the length X is length of the side of the square shape of the IC chip 30.

$$\alpha > X \tag{2'}$$

Next, the method for manufacturing the RFID tag 100 is described with reference to FIGS. 7 to 9.

FIGS. 7A to 9B are diagrams illustrating the manufacturing steps of the RFID tag 100 according to the first embodiment. FIGS. 7A, 7C, 8A, 8C and 9A are diagrams illustrating the cross sections of the RFID tag 100 in the manufacturing steps, respectively. FIGS. 7B, 7D, 8B, 8D and 9B are diagrams illustrating the RFID tag 100 in the manufacturing steps in plan view, respectively. The cross sections as illustrated in FIGS. 7A, 7C, 8A, 8C and 9A illustrate A-A cross sections of the RFID tag 100 as illustrated in FIGS. 7B, 7D, 8B, 8D and 9B, respectively.

In FIGS. 7A to 9B, the connecting portion of the IC chip 30 and the antenna 20 is enlarged, in a manner similar to FIG. 3B.

At first, the base 10 which is formed by calendaring performed by the calender machine or extrusion etc. is provided, and then the silver paste 23 is printed on the surface 10B of the base 10, in order to form the antenna 20.

Figure 7A:
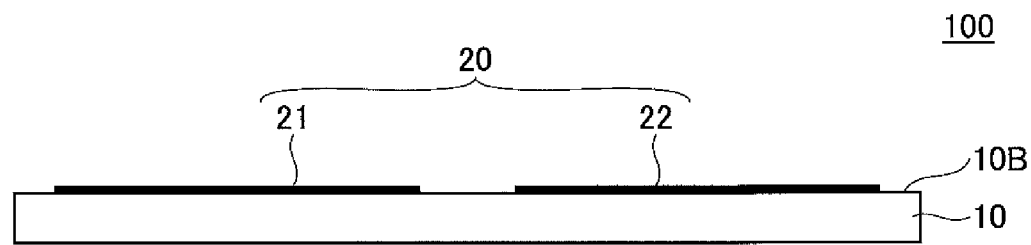
FIG. 7A is a diagram illustrating the manufacturing steps of the RFID tag according to the first embodiment.
Figure 7B:
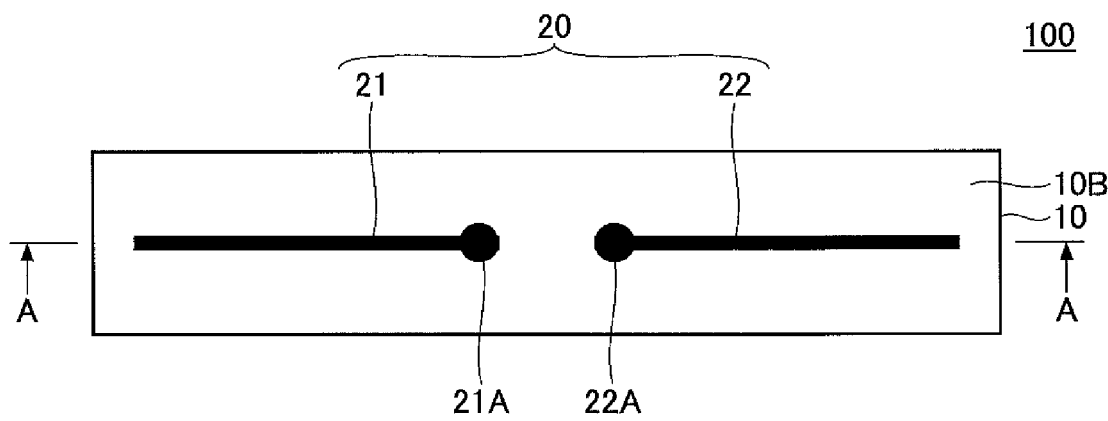
FIG. 7B is a diagram illustrating the manufacturing steps of the RFID tag according to the first embodiment.

Next, the silver paste 23 is heated in a state where the silver paste 23 is formed on the surface 10B of the base 10 so that the binder 25 is thermally hardened and becomes a condition in that the binder has flexibility and elasticity. The antenna 20 which includes the antenna portions 21 and 22 having flexibility and elasticity is formed by the steps described above. The antenna portions 21 and 22 include the terminals 21A and 22A as illustrated in FIG. 7B.

Figure 7C:
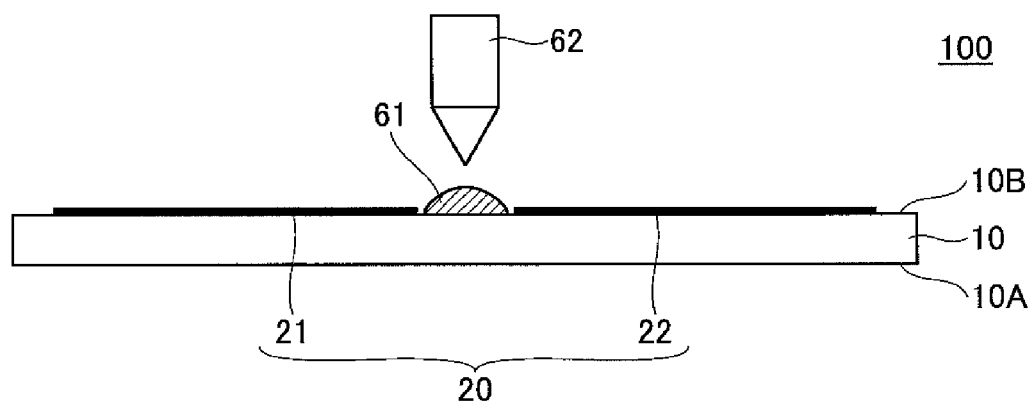
FIG. 7C is a diagram illustrating the manufacturing steps of the RFID tag according to the first embodiment.
Figure 7D:
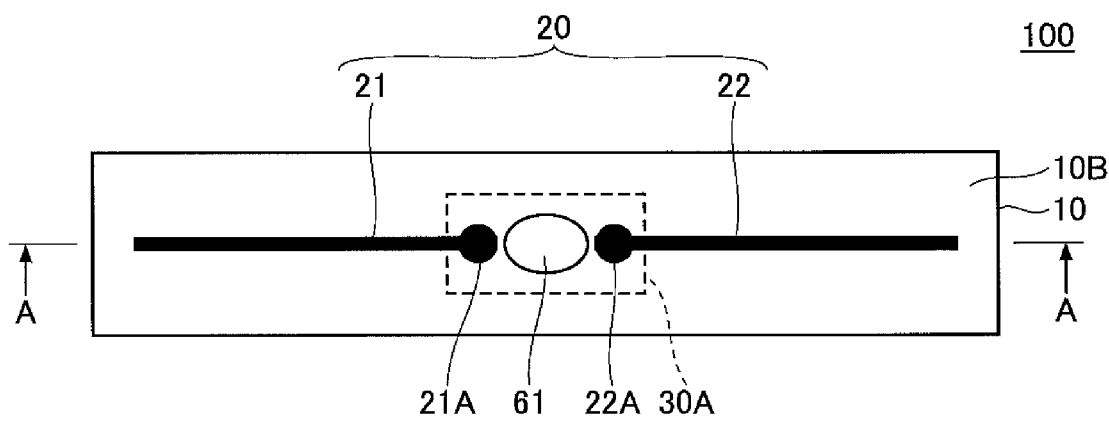
FIG. 7D is a diagram illustrating the manufacturing steps of the RFID tag according to the first embodiment.

Next, an adhesion bond 61 is applied to a portion of the surface 10B of the base between the terminals 21A and 22A of the antenna portions 21 and 22 as illustrated in FIGS. 7C and 7D. The adhesion bond 61 is applied on the surface 10B of the base 10 by using a syringe 62 as illustrated in FIG. 7C, for example.

As the adhesion bond 61, an epoxy type thermosetting adhesion bond which is suitable for mounting the IC chip 30 on the surface 10B of the base 10 by flip-chip bonding may be used, for example. The portion to which the adhesion bond 61 is applied is located between the terminals 21A and 22A.

Figure 8A:
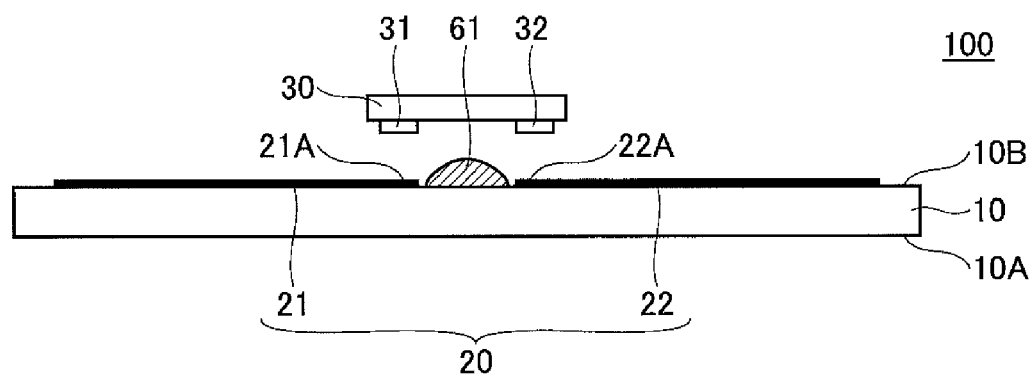
FIG. 8A is a diagram illustrating the manufacturing steps of the RFID tag according to the first embodiment.
Figure 8B:
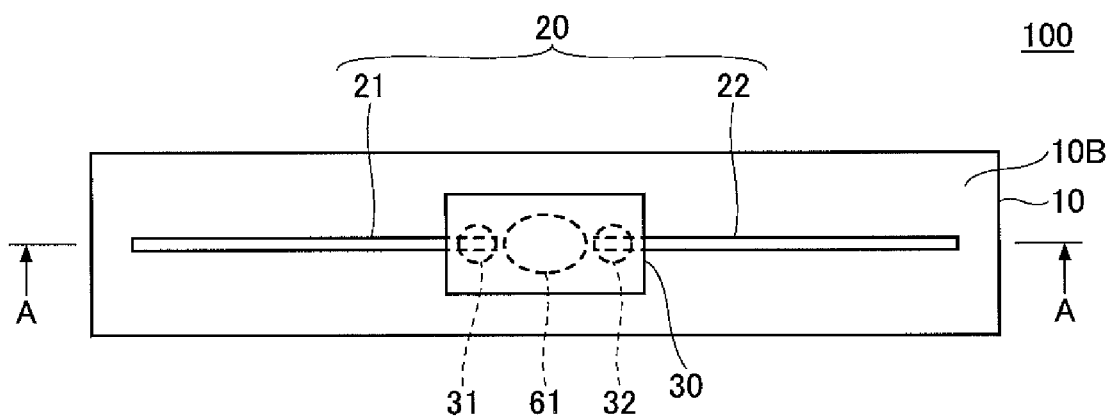
FIG. 8B is a diagram illustrating the manufacturing steps of the RFID tag according to the first embodiment.

Next, the IC chip 30 is mounted on the surface 10B of the base 10 as illustrated in FIGS. 8A and 8B. The bumps 31 and 32 are attached to the terminals of the IC chip 30 that are located on the bottom surface of the IC chip 30 and are used for communication. Then the IC chip 30 is mounted on the adhesion bond 61 in a state where the bumps 31 and 32 are aligned to the terminals 21A and 22A of the antenna portions 21 and 22.

Then the bumps 31 and 32 and the terminals 21A and 22A are electrically connected by heating and thermally hardening the adhesion bond 61 and thereby pressing the bumps 31 and 32 and the terminals 21A and 22A while the IC chip 30 is being pressed to the base 10. At this step, the adhesion bond 61 is thermally hardened and becomes the underfill resin 60.

Herein, the bumps 31 and 32, the terminals 21A and 22A and the underfill resin 60 constitute the connecting portion 20A (see FIG. 2A).

Figure 8C:
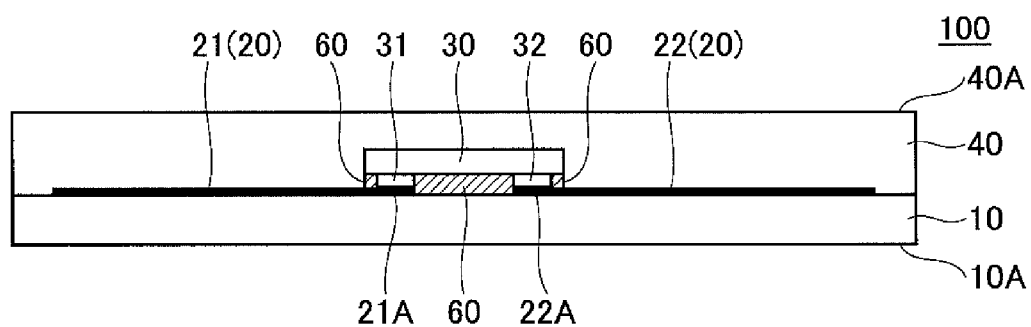
FIG. 8C is a diagram illustrating the manufacturing steps of the RFID tag according to the first embodiment.
Figure 8D:
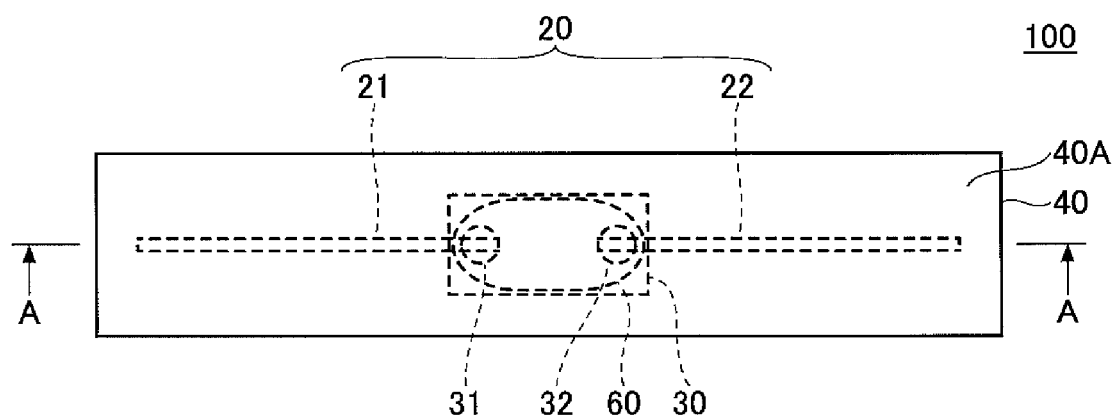
FIG. 8D is a diagram illustrating the manufacturing steps of the RFID tag according to the first embodiment.

Next, the cover 40 is attached to the base 10 as illustrated in FIGS. 8C and 8D. The cover 40 is formed by calendaring performed by the calender machine or extrusion etc. According to the first embodiment, the cover 40 is constituted of the sheet-like member as same as that of the base 10.

The cover 40 is bonded by an adhesion bond onto the surface 10B (see FIGS. 8A and 8B) of the base 10 on which the IC chip 30 is mounted. Thus, the antenna 20 and the IC chip 30 are covered by the cover 40.

The adhesion bond which bonds the base 10 and the cover 40 may be any kind of an adhesion bond as long as the adhesion bond can bond the base 10 and the cover 40 while keeping flexibility and elasticity of the base 10 and the cover 40.

It is preferable to use an adhesion bond which contains similar material to that of the base 10 and the cover 40, for example. For example, in a case where the base 10 and the cover 40 are made from silicone (silica-ketone) rubber, butyl rubber or a nitrile rubber, an adhesion bond which includes the silicone (silica-ketone) rubber, the butyl rubber or the nitrile rubber may be used for bonding the base 10 and the cover 40.

Herein, the base 10 and the cover 40 may be bonded without using the adhesion bond. The base 10 and the cover 40 are bonded by thermocompression bonding, for example. In this case, at first, the opposite surface of the cover 40 to the surface 40A is melted by heating, and then the melted surface of the cover 40 is bonded to the base 10 by pressing the cover 40 to the base 10, for example.

Next, the reinforcing members 50A and 50B are attached to the surfaces 10A and 40A of the base 10 and the cover 40, respectively.

Figure 9A:
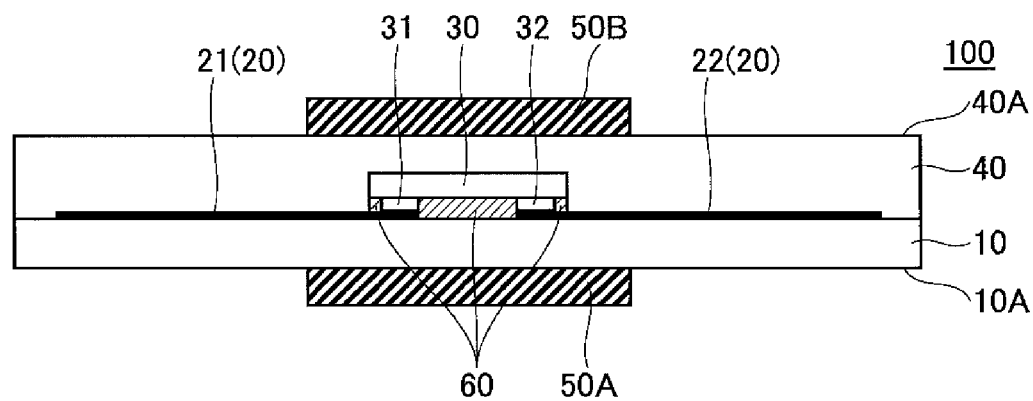
FIG. 9A is a diagram illustrating the manufacturing steps of the RFID tag according to the first embodiment.
Figure 9B:
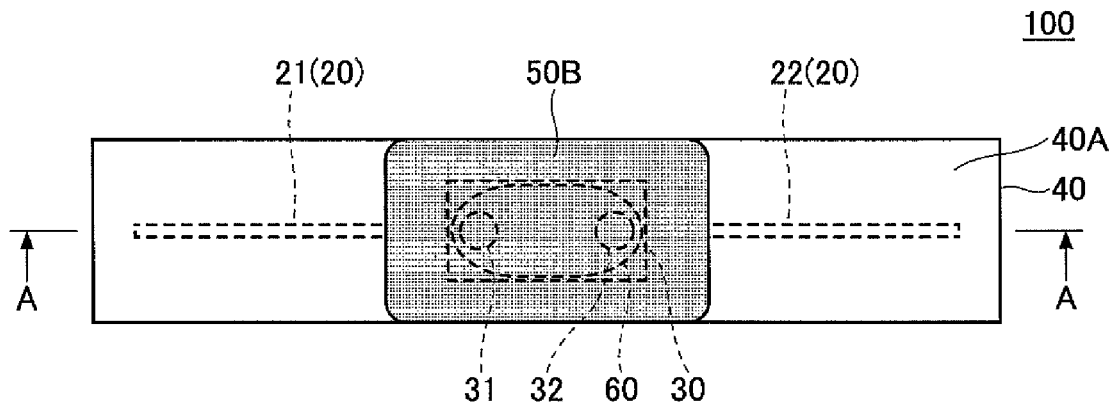
FIG. 9B is a diagram illustrating the manufacturing steps of the RFID tag according to the first embodiment.

The reinforcing member 50A is adhered to a portion of the surface 10A of the base 10 which is located under the IC chip 30, the terminals 21A and 22A and bumps 31 and 32 as illustrated in FIG. 9A. Herein, the terminals 21A and 22A, the bumps 31 and 32 and the underfill resin 60 constitute the connecting portion 20A (see FIG. 2A).

The reinforcing member 50B is adhered to a portion of the surface 40A of the cover 40 which is located over the IC chip 30, the terminals 21A and 22A and bumps 31 and 32 as illustrated in FIG. 9A.

The reinforcing members 50A and 50B may be attached to the surfaces 10A and 40A of the base 10 and the cover 40, respectively, by using an adhesion bond. The adhesion bond may be any kind of an adhesion bond as long as the adhesion bond can bond between the base 10 and the reinforcing member 50A and between the cover 40 and the reinforcing member 50B, respectively, while keeping flexibility and elasticity of the base 10, the cover 40 and the reinforcing members 50A and 50B.

It is preferable to use an adhesion bond which contains similar material to that of the base 10, the cover 40 and the reinforcing members 50A and 50B, for example. For example, in a case where the base 10, the cover 40 and the reinforcing members 50A and 50B are made from silicone (silica-ketone) rubber, butyl rubber or a nitrile rubber, an adhesion bond which includes the silicone (silica-ketone)

rubber, the butyl rubber or the nitrile rubber may be used for bonding the base 10, the cover 40 and the reinforcing members 50A and 50B respectively.

Herein, the base 10, the cover 40 and the reinforcing members 50A and 50B may be bonded without using the adhesion bond. The base 10, the cover 40 and the reinforcing members 50A and 50B are bonded by thermocompression bonding, for example. In this case, at first, adhesion surfaces of the reinforcing members 50A and 50B are melted by heating, and then the melted surfaces of the reinforcing members 50A and 50B are bonded to the surfaces 10A and 40A of the base 10 and the cover 40 by pressing the reinforcing members 50A and 50B to the base 10 and the cover 40, for example. Accordingly, an assembly of the RFID tag 100 is completed by the steps as described above.

As described above, according to the RFID tag 100 of the first embodiment, the sizes of the reinforcing members 50A and 50B are larger than the size of the IC chip 30 in plan view (see formula (1)) and the length α, as illustrated in FIG. 6D, is longer than the maximum length (√2×X) of the IC chip 30 (see formula (2)).

Thus, it becomes possible to suppress the breakage of the IC chip 30 and the connecting portion 20A by protecting the IC chip 30 and the connecting portion 20A by the reinforcing members 50A and 50B, the base 10 and the cover 40 in a case where the RFID tag 100 is twisted obliquely and bent in a U-shape as illustrated in FIG. 6C and is further squashed by the pressure as illustrated in FIG. 6D.

Accordingly, it becomes possible to provide the RFID tag 100 which has very high durability and can suppress the breakage of the IC chip 30 and the connecting portion 20A, if the RFID tag 100 is subjected to a harsh condition such as the press extraction, for example.

Although, as described above, the dipole type antenna 20 having a straight pattern (see FIG. 3A) is described, the pattern of the antenna 20 is not limited to the straight pattern.

Figure 10:
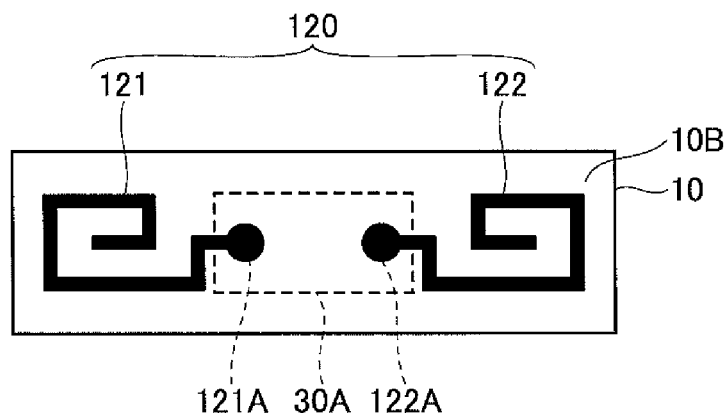
FIG. 10 is a diagram illustrating an antenna of RFID tag according to an exemplary variation of the first embodiment.

FIG. 10 is a diagram illustrating an antenna 120 of RFID tag 100 according to an exemplary variation of the first embodiment. The antenna 120 includes antenna portions 121 and 122 formed on the surface 10B of the base 10. The antenna portions 121 and 122 are bent to have rectangular spiral patterns in plan view, respectively.

The antenna portions 121 and 122 have the same lengths as those of the antenna portions 21 and 22 as illustrated in FIG. 3A, respectively. The antenna 120 has similar configuration to that of the antenna 20 as illustrated in FIG. 3A except for the pattern in plan view.

Since the antenna portions 121 and 122 of the antenna 120 have the rectangular spiral patterns, it becomes possible to reduce the sizes of the base 10 and the cover 40 in plan view by utilizing the antenna 120 as illustrated in FIG. 10 instead of the antenna 20 as illustrated in FIG. 3A. The lateral length of the base 10 as illustrated in FIG. 10 is two third of that of the base 10 as illustrated in FIG. 3A.

The size of the RFID tag 100 may be reduced by utilizing the antenna 120 having the rectangular spiral shape in plan view.

Figure 11:
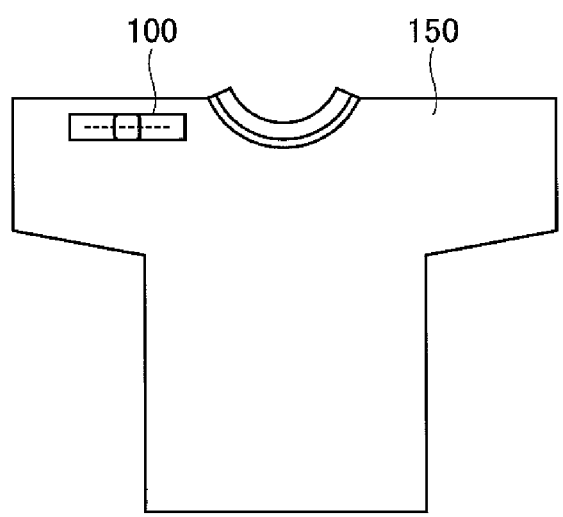
FIG. 11 is a diagram illustrating a T-shirt to which the RFID tag of the first embodiment is fitted.

FIG. 11 is a diagram illustrating a T-shirt 150 to which the RFID tag 100 of the first embodiment is fitted. The RFID tag 100 is fitted to the right shoulder portion of the T-shirt 150. The RFID tag 100 of the first embodiment may be fitted to the T-shirt 150 as illustrated in FIG. 11 or the laundry.

Figure 12:
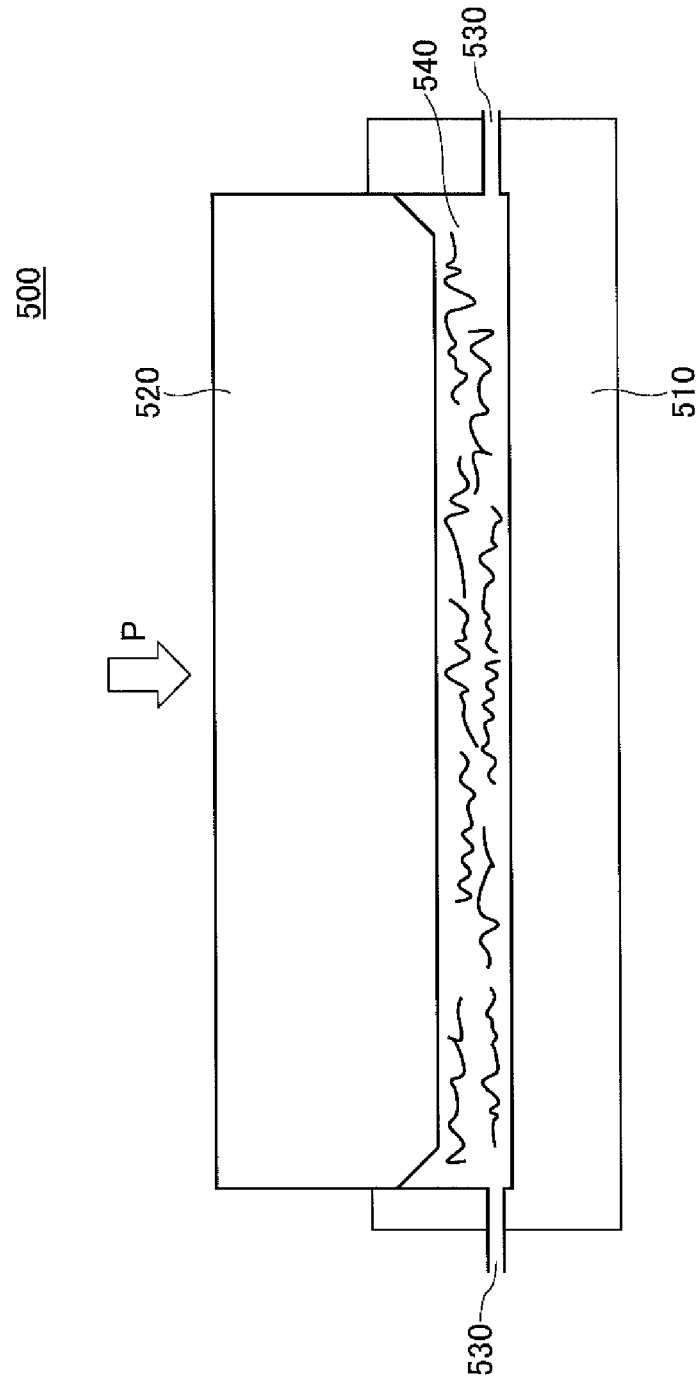
FIG. 12 is a diagram illustrating a dewaterer which performs the press extraction.

FIG. 12 is a diagram illustrating a dewaterer 500 which performs the press extraction.

The T-shirt 150 to which the RFID tag 100 is fitted may be dewatered by the dewaterer 500 after being washed by a washing machine.

The dewaterer 500 includes a cylinder 510, a press piston 520 and a drain outlet 530. A large amount of the laundry 540 which is put into the cylinder 510 is being pressed by the press piston 520 in order to perform the press extraction and to dewater the laundry in a forcible manner. For example, the pressure ranging from 30 kgf/cm$^2$ to 50 kgf/cm$^2$ is applied to the laundry between the cylinder 510 and the press piston 520 during the press extraction. Water which is dewatered from the laundry 540 is drained via the drain outlet 530.

If the T-shirt 150 is included in the laundry 540 and the RFID tag 100 which is fitted to the T-shirt 150 is obliquely bent in a U-shape and squashed, the IC chip 30 and the connecting portion 20A are protected by the reinforcing members 50A and 50B, the base 10 and the cover 40. Thus, it becomes possible to suppress the breakage of the IC chip 30 and the connecting portion 20A if the T-shirt 150 is subjected to the press extraction.

Accordingly, it becomes possible to provide the RFID tag 100 which has very high durability and the ability to suppress the breakage of the IC chip 30 and the connecting portion 20A, if the RFID tag 100 is subjected to the press extraction performed by the dewaterer 500, for example.

Although, the embodiment in that the hardness of the reinforcing members 50A and 50B is higher than the hardness of the base 10 and the cover 40 is described above, the hardness of the reinforcing members 50A and 50B, the base 10 and the cover 40 is not limited to the hardness as described above.

Hardness of the reinforcing members 50A and 50B may be lower than the hardness of the base 10 and the cover 40, respectively. Hardness of the reinforcing members 50A and 50B may also be equal to the hardness of the base 10 and the cover 40, respectively In a case where the hardness of the reinforcing members 50A and 50B is lower than the hardness of the base 10 and the cover 40, the rubber hardness may be set to the values as follows.

For example, in a case where the rubber hardness of the base 10 and the cover 40 are set to JIS A 70, the rubber hardness of the reinforcing members 50A and 50B may be set to a value ranging from JIS A 20 to JIS A 40.

In a case where the rubber hardness of the reinforcing members 50A and 50B is equal to the hardness of the base 10 and the cover 40, the rubber hardness of the reinforcing members 50A and 50B, the base 10 and the cover 40 are set to a value ranging from JIS A 70 to JIS A 80, for example.

Herein, the rubber hardness of the reinforcing members 50A and 50B, the base 10 and the cover 40 of the first embodiment is illustrative only. Thus, the hardness of the reinforcing members 50A and 50B, the base 10 and the cover 40 is not limited to the value as described above. The hardness is not limited to the rubber hardness. Thus, the hardness may be set to values that are represented by other hardness other than the rubber hardness, in a case where an elastomer is used, for example.

Second Embodiment

An RFID tag 200 is different from the RFID tag 100 in that reinforcing members 250A and 250B are formed with a base 210 and a cover 240, respectively, in an integrated fashion. Otherwise, the RFID tag 200 according to the second embodiment is the same as the RFID tag 100 of the first embodiment. Accordingly, the same elements as or elements similar to those of the RFID tag 100 of the first embodiment are referred to by the same reference numerals, and a description thereof is omitted.

Figure 13A:
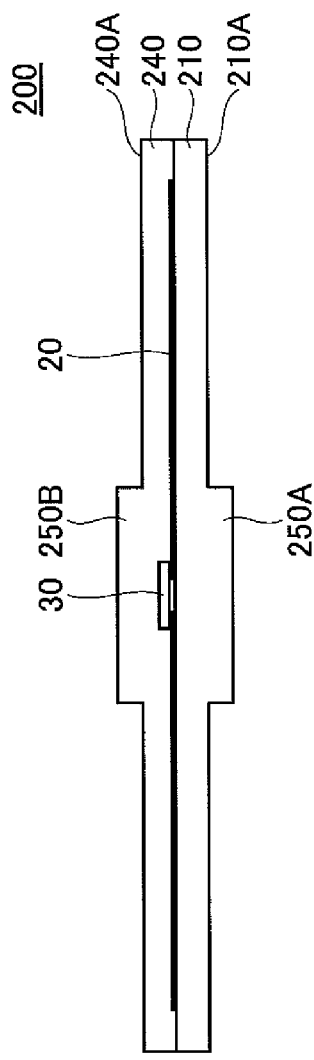
FIG. 13A is a diagram illustrating a cross section of the RFID tag along the longitudinal direction.
Figure 13B:
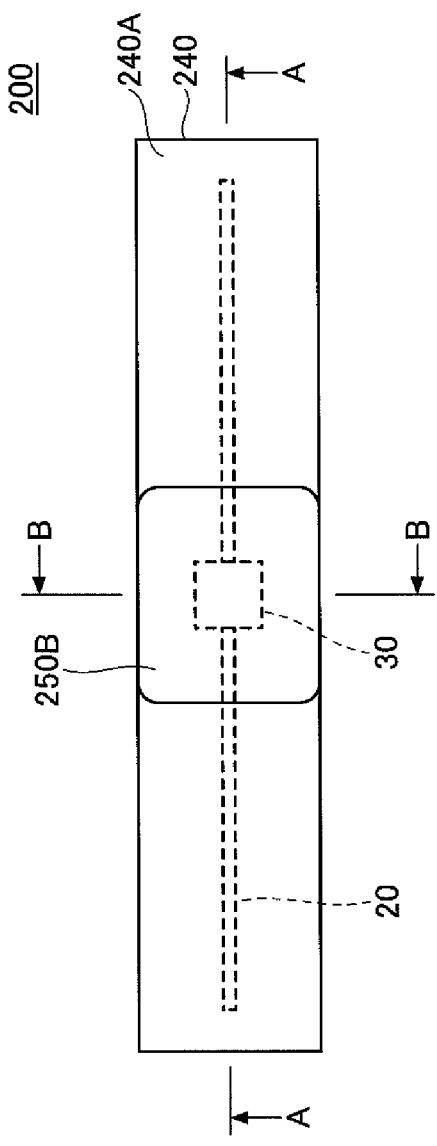
FIG. 13B is a diagram illustrating the RFID tag in plan view.
Figure 13C:
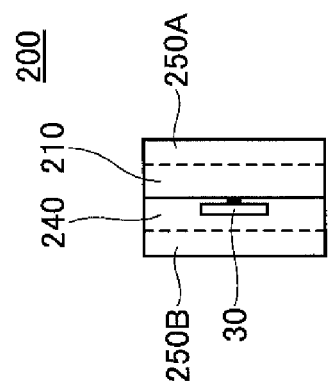
FIG. 13C is a diagram illustrating the RFID tag along the direction orthogonal to the longitudinal direction.

FIG. 13A is a diagram illustrating a cross section of the RFID tag 200 along the longitudinal direction. FIG. 13B is a diagram illustrating the RFID tag 200 in plan view. FIG. 13C is a diagram illustrating the RFID tag 200 along the direction orthogonal to the longitudinal direction. FIG. 13A illustrates an A-A cross section of the RFID tag 200 as illustrated in FIG. 13B. FIG. 13C illustrates a B-B cross section of the RFID tag 200 as illustrated in FIG. 13B.

The reinforcing member 250A is formed on a surface 210A of the base 210, and is projected from the surface 210A when an assembly of the RFID tag 200 is completed. This is similar to the reinforcing member 50A of the first embodiment which is formed on the surface 10A of the base 10 and is projected from the surface 10A.

The reinforcing member 250A is formed with the base 210 in an integrated fashion. The base 210 which is formed with the reinforcing member 250A in an integrated fashion is formed by extrusion etc.

The reinforcing member 250B is formed on a surface 240A of the cover 240, and is projected from the surface 240A when the assembly of the RFID tag 200 is completed. This is similar to the reinforcing member 50B of the first embodiment which is formed on the surface 40A of the cover 40 and is projected from the surface 40A.

The reinforcing member 250B is formed with the cover 240 in an integrated fashion. The cover 240 which is formed with the reinforcing member 250B in an integrated fashion is formed by extrusion etc.

As described above, in the RFID tag 200 of the second embodiment, the reinforcing members 250A and 250B are formed with the base 210 and the cover 240 in an integrated fashion, respectively. Thus, a method for manufacturing the RFID tag 200 does not include the step for adhering the reinforcing members 50A and 50B to the base 10 and the cover 40. The method for manufacturing the RFID tag 200 is similar to the manufacturing method of the RFID tag 100 of the first embodiment except for the step for adhering the reinforcing members 50A and 50B to the base 10 and the cover 40.

Accordingly, a description of the method for manufacturing the RFID tag 200 is omitted.

Herein, the reinforcing members 250A and 250B are similar to the reinforcing members 50A and 50B of the first embodiment except that the reinforcing members 250A and 250B are formed with the base 210 and the cover 240 in an integrated fashion.

Accordingly, lengths L and thicknesses D of the reinforcing members 250A and 250B are similar to the lengths L and the thicknesses D of the reinforcing members 50A and 50B and satisfy formulas (1) to (3).

Thus, according to the RFID tag 200 of the second embodiment, the sizes of the reinforcing members 250A and 250B are larger than the size of the IC chip 30 in plan view (see formula (2)) and the length α (see FIG. 6D) is longer than the maximum length ($\sqrt{2} \times X$) of the IC chip 30 (see formula (2)).

Thus, it becomes possible to suppress the breakage of the IC chip 30 and the connecting portion 20A by protecting the IC chip 30 and the connecting portion 20A by the reinforcing members 250A and 250B, the base 210 and the cover 240 in a case where the RFID tag 200 is twisted obliquely and bent in a U-shape and is further squashed by the pressure.

Accordingly, it becomes possible to provide the RFID tag 200 which has very high durability and can suppress the breakage of the IC chip 30 and the connecting portion 20A, if the RFID tag 100 is subjected to a harsh condition such as the press extraction, for example.

Third Embodiment

An RFID tag 300 according to the third embodiment is different from the RFID tag 100 of the first embodiment in that the IC chip 30 is mounted on a strap 370 and the strap 370 is attached to the base 10. Since the RFID tag 300 includes the above differences, the sizes of the reinforcing members 50A and 50B are increased compared with the reinforcing members 50A and 50B of the first embodiment. Otherwise, the RFID tag 300 according to the third embodiment is the same as the RFID tag 100 of the first embodiment. Accordingly, the same elements as or elements similar to those of the RFID tag 100 of the first embodiment are referred to by the same reference numerals, and a description thereof is omitted.

Figure 14A:
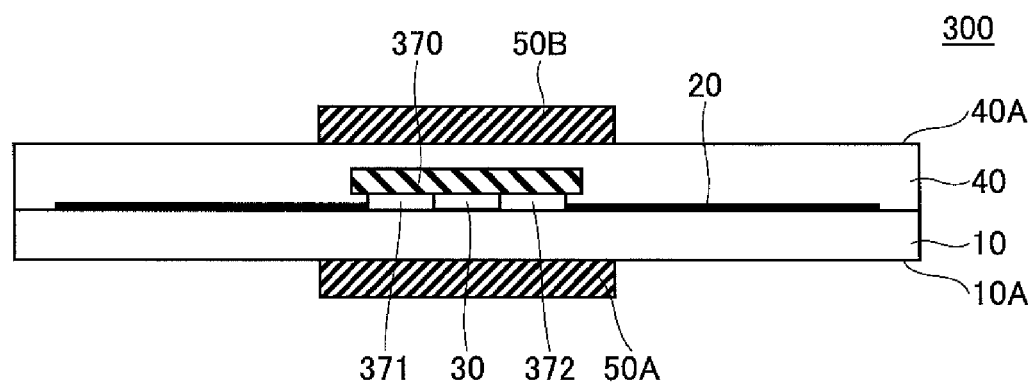
FIG. 14A is a diagram illustrating a cross section of the RFID tag along the longitudinal direction.
Figure 14B:
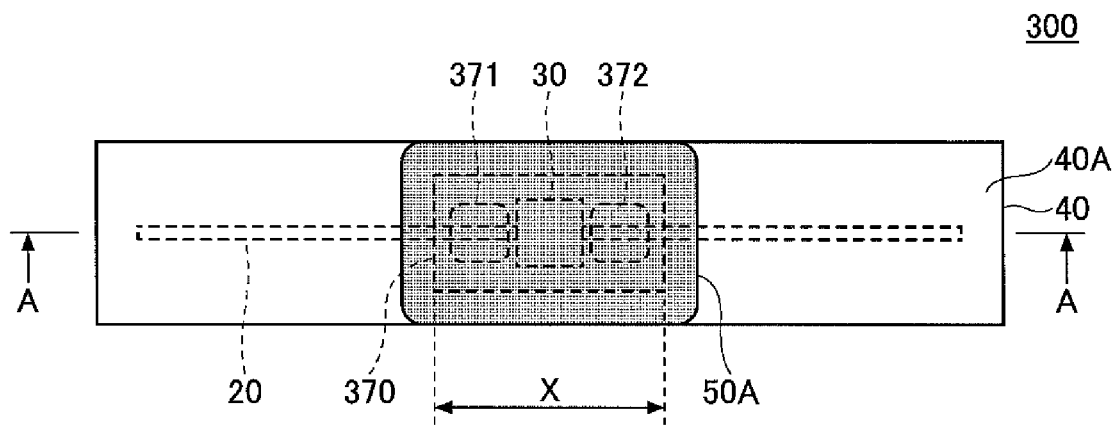
FIG. 14B is a diagram illustrating the RFID tag in plan view.

FIG. 14A is a diagram illustrating a cross section of the RFID tag 300 along the longitudinal direction. FIG. 14B is a diagram illustrating the RFID tag 300 in plan view. FIG. 14A illustrates an A-A cross section of the RFID tag 300 as illustrated in FIG. 14B.

The IC chip 30 is mounted on the strap 370 by flip-chip bonding, and the strap 370 is attached on the base 10. Connecting portions 371 and 372 of the strap 370 are attached to the terminals 21A and 22A (see FIG. 3A) of the antenna 20 in a condition in that the IC chip 30 is mounted on the bottom surface of the strap 370. The strap 370 may be a type of a film-like member which is made of the polyethylene film or may be a sheet-like member similar to the member of the base 10. Thus, the strap 370 has flexibility and elasticity.

As illustrated in FIGS. 14A and 14B, lateral lengths of the reinforcing members 50A and 50B are increased compared with the reinforcing members 50A and 50B of the first embodiment.

According to the third embodiment, the IC chip 30 is attached to the base in a condition where the IC chip 30 is turned upside down compared with the IC chip 30 of the first embodiment. The detail of the IC chip 30 of the third embodiment and a method for manufacturing the RFID tag 300 is described with reference to FIGS. 15 to 18.

FIGS. 15A to 18B are diagrams illustrating the manufacturing steps of the RFID tag 300 according to the third embodiment.

Figure 15A:
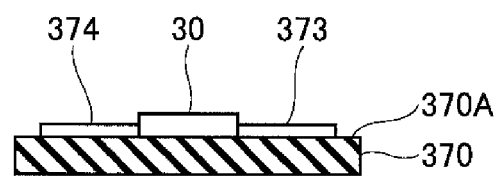
FIG. 15A is a diagram illustrating the manufacturing steps of the RFID tag according to the third embodiment.
Figure 15B:
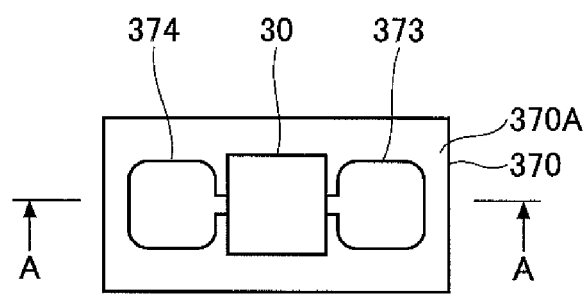
FIG. 15B is a diagram illustrating the manufacturing steps of the RFID tag according to the third embodiment.
Figure 16A:
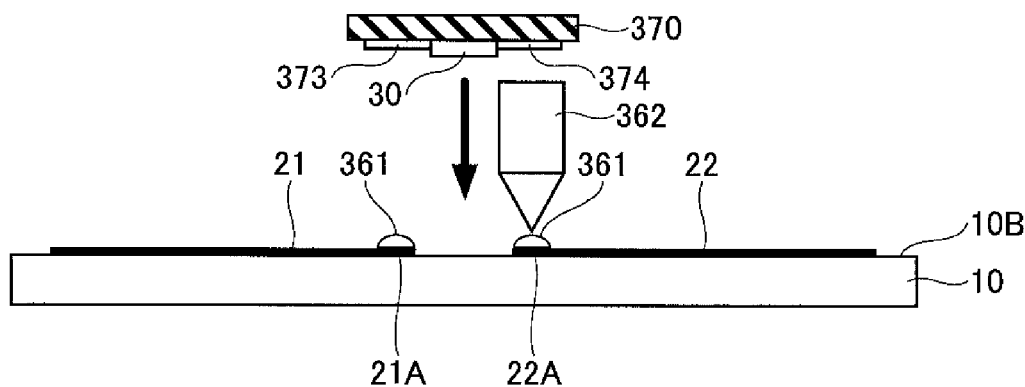
FIG. 16A is a diagram illustrating the manufacturing steps of the RFID tag according to the third embodiment.
Figure 16B:
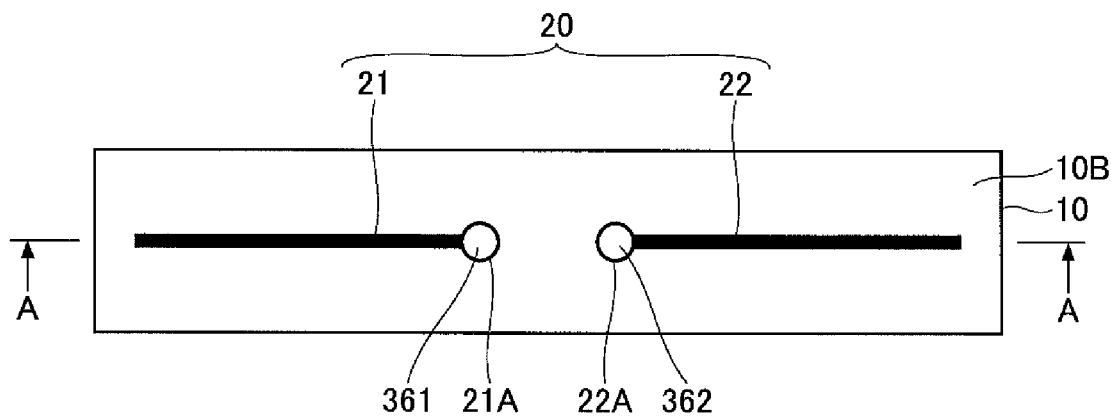
FIG. 16B is a diagram illustrating the manufacturing steps of the RFID tag according to the third embodiment.
Figure 17A:
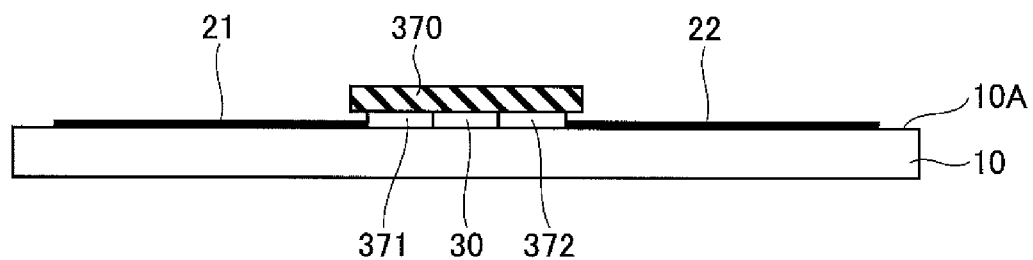
FIG. 17A is a diagram illustrating the manufacturing steps of the RFID tag according to the third embodiment.
Figure 17B:
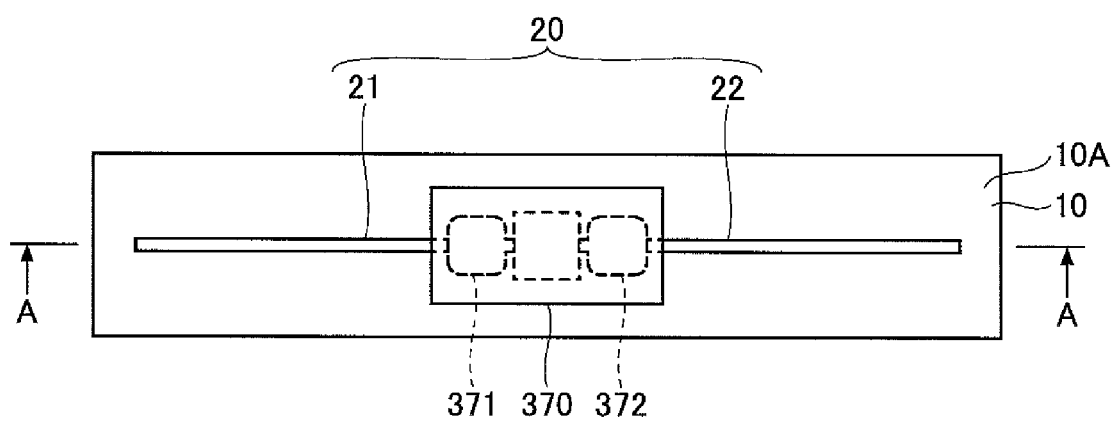
FIG. 17B is a diagram illustrating the manufacturing steps of the RFID tag according to the third embodiment.
Figure 18A:
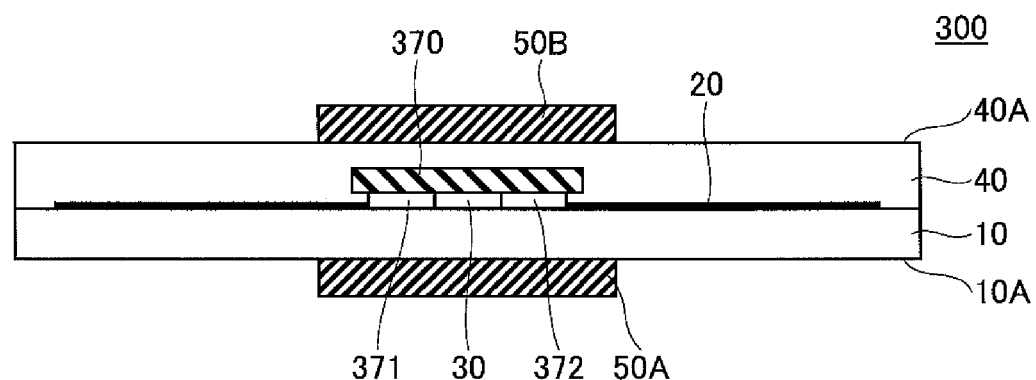
FIG. 18A is a diagram illustrating the manufacturing steps of the RFID tag according to the third embodiment.
Figure 18B:
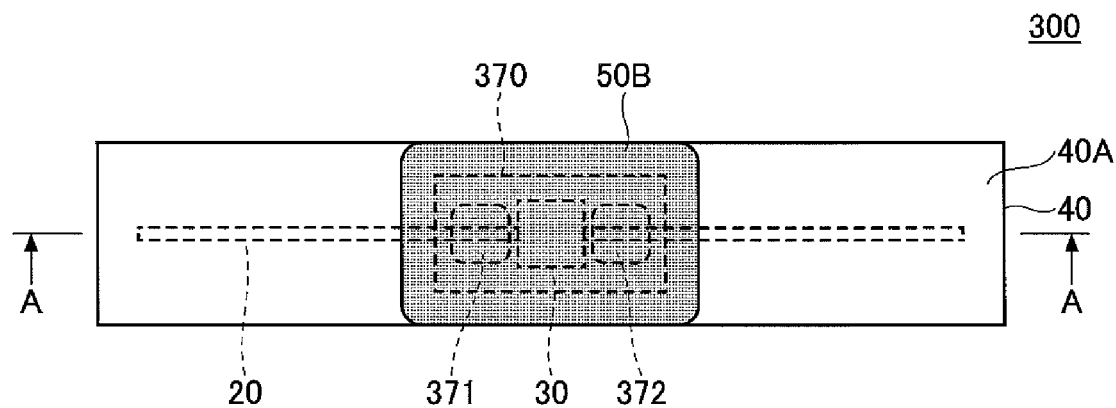
FIG. 18B is a diagram illustrating the manufacturing steps of the RFID tag according to the third embodiment.

FIG. 15A is a diagram illustrating the strap 370 on which the IC chip 30 is mounted. FIG. 15B is a diagram illustrating the strap 370 as illustrated in FIG. 15A in plan view. FIG. 15A illustrates an A-A cross section of the RFID tag 300 as illustrated in FIG. 15B FIGS. 16A, 17A and 18A are diagrams illustrating the cross sections of the RFID tag 300 in the manufacturing steps. FIGS. 16B, 17B and 18B are diagrams illustrating the RFID tag 300 in the manufacturing steps in plan view, respectively. The cross sections as illustrated in FIGS. 16A, 17A and 18A illustrate A-A cross sections of the RFID tag 300 as illustrated in FIGS. 16B, 17B and 18B, respectively.

The IC chip 30 of the RFID tag 300 according to the third embodiment is mounted on a surface 370A of the strap 370 by flip-chip bonding as illustrated in FIGS. 15A and 15B.

The strap 370 includes pads 373 and 374 that are formed on the surface 370A as illustrated in FIGS. 15A and 15B. The pads 373 and 374 may be copper foils or aluminum foils, for example.

Similar to the IC chip 30 of the first embodiment which is mounted on the base 10 by flip-chip bonding via the bumps 31 and 32, the IC chip 30 of the third embodiment is mounted on the strap 370 by flip-chip bonding via bumps. The terminals that are used for communication are connected to the pads 373 and 374 of the strap 370 via the bumps.

Next, a conductive adhesive 361 is applied to the terminals 21A and 22A of the antenna portions 21 and 22 printed on the base 10 by using a syringe 362. Then the pads 373 and 374 of the strap 370 and the terminals 21A and 22A are connected via the conductive adhesive 361.

As illustrated in FIGS. 17A and 17B, the terminals 21A and 22A, the pads 373 and 374 and the conductive adhesive 361 become the connecting portions 371 and 372 by connecting the pads 373 and 374 of the strap 370 to the terminals 21A and 22A via the conductive adhesive 361.

Herein, the conductive adhesive 361 may be a silver paste or a copper paste, for example. In a case where the strap 370 is made of polyethylene, the conductive adhesive 361 may not have flexibility and elasticity. On the contrary, in a case where the strap 370 has flexibility and elasticity, it is preferable that the conductive adhesive 361 has flexibility and elasticity similar to the silver paste 23 of the first embodiment.

At the steps as illustrated in FIGS. 17A and 17B, the IC chip 30 is mounted on the surface 10A of the base 10 via the strap 370.

Next, the cover 40 is adhered on the base 10 in a similar manner that the cover 40 of the first embodiment is adhered on the base 10. Then the reinforcing members 50A and 50B are adhered to the surfaces 10A and 40A of the base 10 and the cover 40 as illustrated in FIGS. 18A and 18B. Accordingly, an assembly of the RFID tag 300 is completed by the steps as described above.

Herein, in the RFID tag 300 of the third embodiment, the length X which is represented by formula (2) in the first embodiment appears as length of the long side of the strap 370 as illustrated in FIG. 14B. Although, the connecting portion 20A of the first embodiment is located under the IC chip 30 (see FIG. 2A), the connecting portions 371 and 372 of the third embodiment are located outside of the IC chip 30 and located inside of an outline of the strap 370 in plan view. Accordingly, it becomes possible to suppress deformation of the strap 370, if the length of the long side of the strap 370 is set to the length X which satisfies formula (2). Thus, it becomes possible to suppress deformation of the IC chip 30 and the connecting portions 371 and 372 by suppressing deformation of the strap 370 as described above.

The RFID tag 300 of the third embodiment is similar to the RFID tag 100 of the first embodiment except that the IC chip 30 is mounted on the base 10 via the strap 370 and the length of the long side of the strap 370 is set to the length X which satisfies formula (2).

Thus, it becomes possible to suppress the breakage of the IC chip 30 and the connecting portions 371 and 372 by protecting the IC chip 30 and the connecting portions 371 and 372 by the reinforcing members 50A and 50B, the base 10 and the cover 40 in a case where the RFID tag 300 is twisted obliquely and bent in a U-shape and is further squashed by the pressure.

Further, since the IC chip 30 is mounted on the strap 370 by flip-chip bonding, it becomes possible to suppress breakage of connecting portions between the terminals of the IC chip that are used for communication and the strap 370.

Accordingly, it becomes possible to provide the RFID tag 300 which has very high durability and can suppress the breakage of the IC chip 30 and the connecting portions 371 and 372, if the RFID tag 300 is subjected to a harsh condition such as the press extraction, for example.

So far, the preferred embodiments and modification of the RFID tags are described. However, the invention is not limited to those specifically described embodiments and the modification thereof, and various modifications and alteration may be made within the scope of the inventions described in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention.

Although the embodiments of the present invention have been described in detail, it should be understood that the various changes, substitutions, and alterations could be made hereto without departing from the spirit and scope of the invention.

What is claimed is:

1. An RFID tag comprising:
    a first sheet having flexibility and elasticity;
    an antenna having flexibility and elasticity and configured to be formed on a surface of the first sheet;
    an IC chip configured to be electrically connected to the antenna;
    a second sheet having flexibility and elasticity and configured to be attached to the first sheet and to cover the antenna and the IC chip with the first sheet; and
    a reinforcing member having flexibility and elasticity and configured to cover the IC chip and a connecting portion of the IC chip and the antenna,
    wherein the size of the reinforcing member is greater than the size of the IC chip in plan view.

2. The RFID tag as claimed in claim 1, wherein the reinforcing portion is disposed on the outer side of the first sheet or the second sheet.

3. The RFID tag as claimed in claim 2, wherein the reinforcing portion is attached to an outside surface of the first sheet or the second sheet.

4. The RFID tag as claimed in claim 2, wherein the reinforcing member is formed with the first sheet or the second sheet in an integrated manner and is located on the outer side of the first sheet or the second sheet.

5. The RFID tag as claimed in claim 1, wherein hardness of the reinforcing member is higher than hardness of the first sheet or the second sheet.

6. The RFID tag as claimed in claim 1, wherein hardness of the reinforcing member is lower than hardness of the first sheet or the second sheet.

7. The RFID tag as claimed in claim 1, further including:
    a strap configured to be shaped in a sheet-like shape and to be mounted with the IC chip on a surface thereof;
    wherein the IC chip is electrically connected to the antenna by attaching the surface of the strap to a surface of the first sheet on which the antenna is formed in a manner that the surface of the strap faces the surface of the first sheet.

8. The RFID tag as claimed in claim 1, wherein thicknesses D1 and D2, lengths L and X and deformation amounts δ1 and δ2 satisfy formulas (1) and (2):

$$L > X \tag{1}$$

$$\sqrt{2} \times X = 2 \times \{(D1 - \delta1) + (D2 - \delta2)\} \tag{2}$$

where the thickness D1 represents thicknesses of the first sheet and the second sheet, the thickness D2 represents thickness of the reinforcing member, the length L represents length of a long side of the reinforcing member, the length X represents length of a long side of the IC chip, the deformation amount δ1 represents deformation amount of the first sheet and the second sheet squashed by a designated pressure, and the deformation amount δ2 represents deformation amount of the reinforcing member squashed by a designated pressure.

9. The RFID tag as claimed in claim 1, wherein the first sheet or the second sheet is made of a silicone rubber, butyl rubber, a nitrile rubber, a nitrile hydride rubber, a fluoride rubber, an epichlorohydrin rubber, an isoprene rubber, a chlorosulfonated polyethylene rubber, a urethane rubber, an elastomer of vinyl chloride series, an elastomer of styrene series, an elastomer of olefin series, an elastomer of ester series, an elastomer of urethane series or an elastomer of amide series.

10. The RFID tag as claimed in claim 1, wherein the antenna is made of a conductive paste including conductive particles and a binder which is mixed with the conductive particles, and wherein the binder is made of a silicone rubber, butyl rubber, a nitrile rubber, a nitrile hydride rubber, a fluoride rubber, an epichlorohydrin rubber, an isoprene rubber, a chlorosulfonated polyethylene rubber, a urethane rubber.

11. An RFID tag comprising:
a first sheet having flexibility and elasticity;
an antenna having flexibility and elasticity and configured to be formed on a surface of the first sheet;
an IC chip configured to be electrically connected to the antenna;
a second sheet having flexibility and elasticity and configured to be attached to the first sheet and to cover the antenna and the IC chip with the first sheet; and
a reinforcing member having flexibility and elasticity and configured to cover the IC chip and a connecting portion of the IC chip and the antenna,
wherein thicknesses D1 and D2, lengths L and X and deformation amounts δ1 and δ2 satisfy formulas (1) and (2):

$$L > X \quad (1)$$

$$\sqrt{2} \times X = 2 \times \{(D1 - \delta 1) + (D2 - \delta 2)\} \quad (2)$$

where the thickness D1 represents thicknesses of the first sheet and the second sheet, the thickness D2 represents thickness of the reinforcing member, the length L represents length of a long side of the reinforcing member, the length X represents length of a long side of the IC chip, the deformation amount δ1 represents deformation amount of the first sheet and the second sheet squashed by a designated pressure, and the deformation amount δ2 represents deformation amount of the reinforcing member squashed by a designated pressure.

12. The RFID tag as claimed in claim 11, wherein the reinforcing portion is disposed on the outer side of the first sheet or the second sheet.

13. The RFID tag as claimed in claim 12, wherein the reinforcing portion is attached to an outside surface of the first sheet or the second sheet.

14. The RFID tag as claimed in claim 12, wherein the reinforcing member is formed with the first sheet or the second sheet in an integrated manner and is located on the outer side of the first sheet or the second sheet.

15. The RFID tag as claimed in claim 11, wherein hardness of the reinforcing member is higher than hardness of the first sheet or the second sheet.

16. The RFID tag as claimed in claim 11, wherein hardness of the reinforcing member is lower than hardness of the first sheet or the second sheet.

17. The RFID tag as claimed in claim 11, further including:
a strap configured to be shaped in a sheet-like shape and to be mounted with the IC chip on a surface thereof;
wherein the IC chip is electrically connected to the antenna by attaching the surface of the strap to a surface of the first sheet on which the antenna is formed in a manner that the surface of the strap faces the surface of the first sheet.

18. The RFID tag as claimed in claim 11, wherein the first sheet or the second sheet is made of a silicone rubber, butyl rubber, a nitrile rubber, a nitrile hydride rubber, a fluoride rubber, an epichlorohydrin rubber, an isoprene rubber, a chlorosulfonated polyethylene rubber, a urethane rubber, an elastomer of vinyl chloride series, an elastomer of styrene series, an elastomer of olefin series, an elastomer of ester series, an elastomer of urethane series or an elastomer of amide series.

19. The RFID tag as claimed in claim 11, wherein the antenna is made of a conductive paste including conductive particles and a binder which is mixed with the conductive particles, and wherein the binder is made of a silicone rubber, butyl rubber, a nitrile rubber, a nitrile hydride rubber, a fluoride rubber, an epichlorohydrin rubber, an isoprene rubber, a chlorosulfonated polyethylene rubber, a urethane rubber.

* * * * *